United States Patent
Akiyama et al.

(10) Patent No.: US 8,924,606 B2
(45) Date of Patent: Dec. 30, 2014

(54) STORAGE SYSTEM AND DATA TRANSFER CONTROL METHOD

(75) Inventors: Koji Akiyama, Odawara (JP); Susumu Tsuruta, Odawara (JP); Hideaki Fukuda, Odawara (JP); Hiroshi Shimmura, Odawara (JP); Shoji Kato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 345 days.

(21) Appl. No.: 13/395,807

(22) PCT Filed: Mar. 2, 2012

(86) PCT No.: PCT/JP2012/001444
§ 371 (c)(1),
(2), (4) Date: Mar. 13, 2012

(87) PCT Pub. No.: WO2013/128494
PCT Pub. Date: Sep. 6, 2013

(65) Prior Publication Data
US 2013/0232284 A1    Sep. 5, 2013

(51) Int. Cl.
*G06F 13/28* (2006.01)
*G06F 3/00* (2006.01)

(52) U.S. Cl.
USPC .......................................................... 710/23

(58) Field of Classification Search
USPC .......................................................... 710/23
See application file for complete search history.

(56) References Cited

U.S. PATENT DOCUMENTS

| 5,845,061 | A  | * | 12/1998 | Miyamoto et al. | 714/4.4 |
| 2002/0026543 | A1 |   | 2/2002  | Tojima et al. | |
| 2006/0064550 | A1 | * | 3/2006  | Katsuragi et al. | 711/141 |
| 2007/0088930 | A1 | * | 4/2007  | Matsuda et al. | 711/170 |
| 2007/0201434 | A1 | * | 8/2007  | Nakamura et al. | 370/352 |
| 2007/0266204 | A1 | * | 11/2007 | Mizuno | 711/111 |
| 2007/0288692 | A1 |   | 12/2007 | Bruce et al. | |

FOREIGN PATENT DOCUMENTS

| EP | 1 156 422 A2 | 11/2001 |
| JP | 2002-041445 | 2/2002 |

OTHER PUBLICATIONS

PCT International Search Report and Written Opinion on application PCT/JP2012/001444 mailed Aug. 7, 2012, 11 pages.

* cited by examiner

*Primary Examiner* — Henry Tsai
*Assistant Examiner* — Dean Phan
(74) *Attorney, Agent, or Firm* — Foley & Lardner LLP

(57) ABSTRACT

It is provided a storage system for inputting and outputting data in accordance with a request from a host computer, comprising: at least one processor for processing data requested to be input or output; a plurality of transfer controllers for transferring data between memories in the storage system; and at least one transfer sequencer for requesting a data transfer to the plurality of transfer controllers in accordance with an instruction from the processor. The processor transmits a series of data transfer requests to the at least one transfer sequencer. The at least one transfer sequencer requests a data transfer to each of the plurality of transfer controllers based on the series of data transfer requests. The each transfer controller transfers data between the memories in accordance with an instruction from the at least one transfer sequencer.

15 Claims, 23 Drawing Sheets

STORAGE SYSTEM AND DATA TRANSFER CONTROL METHOD

TECHNICAL FIELD

The present invention relates to a storage system.

BACKGROUND ART

A storage system is configured on a plurality of separate substrates each having a buffer memory or a cache memory mounted thereon. Data are transferred between these memories by a DMA controller. Thus, a microprocessor has transmitted a transfer request to the DMA controller for controlling the respective transfers for each data transfer between the memories. This has increased a load on the microprocessor.

When a data transfer in response to a transfer request from the microprocessor is completed, the DMA controller transmits a completion notification to the microprocessor as a requestor. Every time receiving the completion notification, the microprocessor switches a process for processing the completion notification. Thus, the load on the microprocessor has been increased due to this switching overhead.

As such a DMA transfer technology, for example JP 2002-41445 A discloses a DMA controller in which a data transfer controller includes a start command receiving unit and a data transfer request receiving unit for holding the type of a transfer included in a data transfer request for each priority, and the data transfer controller only receives reservation of a request by the data transfer request receiving unit and does not perform a data transfer process. Further, the DMA controller directly holds the types of transfer partners in reservation registers provided for respective priorities and executes a control to transfer data in order from the reservation register having the highest priority until there is no more registered reservation.

SUMMARY OF INVENTION

Technical Problem

As described above, a technology has not been proposed yet which controls a plurality of data transfers performed by a plurality of DMA controllers in a storage system despite a large load on the processor for data transfers between memories.

Thus, it is required in a storage system to control a plurality of data transfers by providing a transfer sequencer for controlling a plurality of DMA controllers.

Solution to Problem

A representative example of the invention disclosed in the present application includes at least one transfer sequencer for requesting data transfers to a plurality of transfer controllers in response to an instruction from a processor.

That is a storage system for inputting and outputting data in accordance with a request from a host computer, comprising: at least one processor for processing data requested to be input or output; a plurality of transfer controllers for transferring data between memories in the storage system; and at least one transfer sequencer for requesting a data transfer to the plurality of transfer controllers in accordance with an instruction from the processor. The processor transmits a series of data transfer requests to the at least one transfer sequencer. The at least one transfer sequencer requests a data transfer to each of the plurality of transfer controllers based on the series of data transfer requests. The each transfer controller transfers data between the memories in accordance with an instruction from the at least one transfer sequencer.

Advantageous Effects of Invention

According to the representative aspect of the present invention, a load on a processor can be reduced.

DESCRIPTION OF EMBODIMENTS

A disk array apparatus is described as an example of an embodiment of a storage system according to the present invention.

<First Embodiment>

Figure 1:
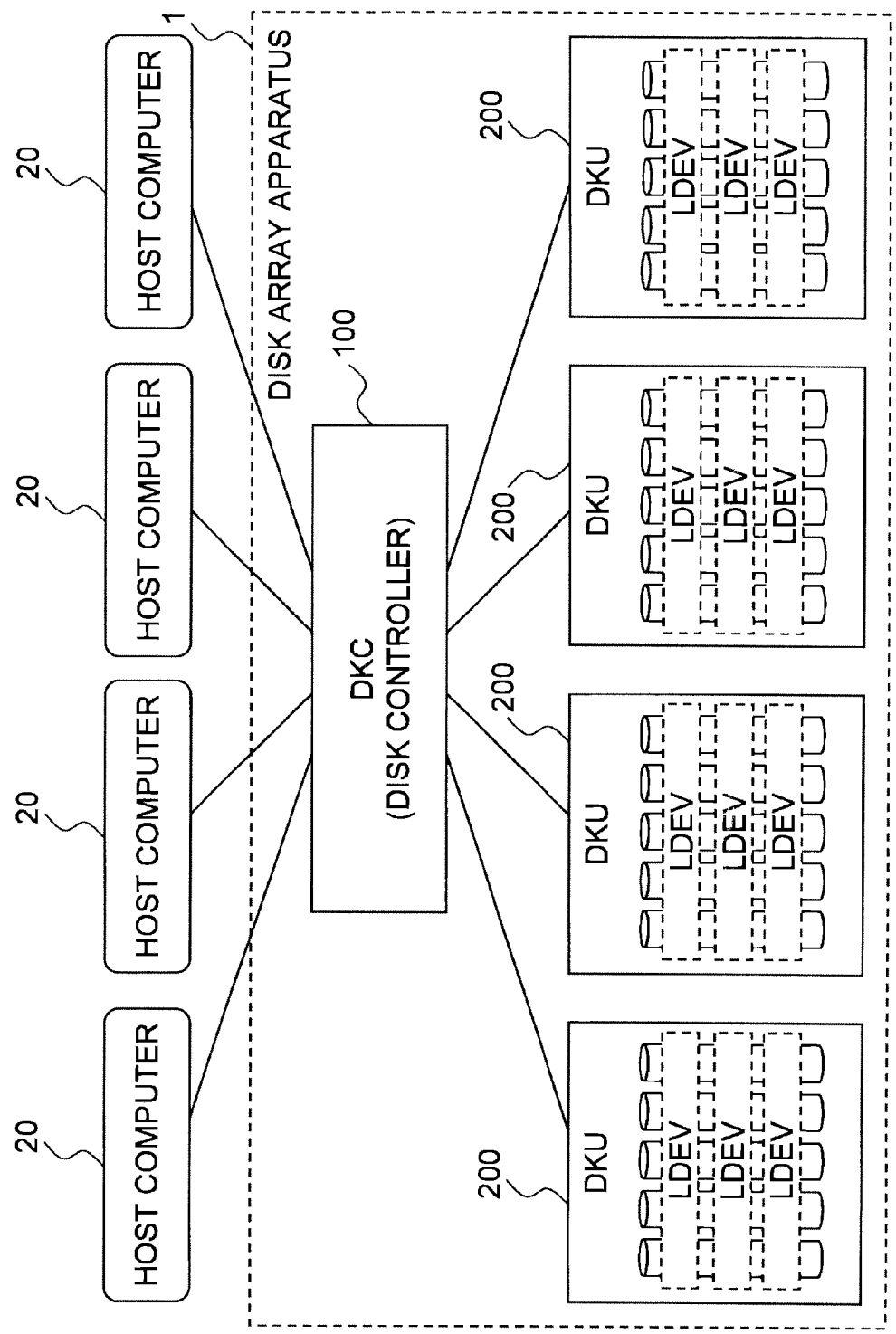
FIG. 1 is a block diagram showing an example of a configuration of a disk array apparatus according to a first embodiment of the present invention.

FIG. 1 is a block diagram showing an example of a configuration of a disk array apparatus according to a first embodiment of the present invention.

The disk array apparatus 1 of this embodiment includes a disk controller (DKC) 100 and a plurality of disk units (DKU) 200.

The disk controller 100 is connected to a plurality of host computers 20. The disk controller 100 is described in detail using FIG. 2.

Each of the plurality of host computers 20 is a computer including a processor, a memory and an interface and, for example, transmits an access request to data issued by an application program to the disk array apparatus 1.

The disk unit 200 is composed of a plurality of magnetic disk drives (storage devices) and stores user data requested from the host computers 20. Note that the plurality of magnetic disk drives configure a logic disk (LDEV) by RAID so that the user data are not lost even if a trouble occurs in at least one magnetic disk drive.

Note that the storage devices constituting the disk unit 200 may be nonvolatile semi-conductor storage devices (SSD) instead of being the magnetic disk drives.

Figure 2:
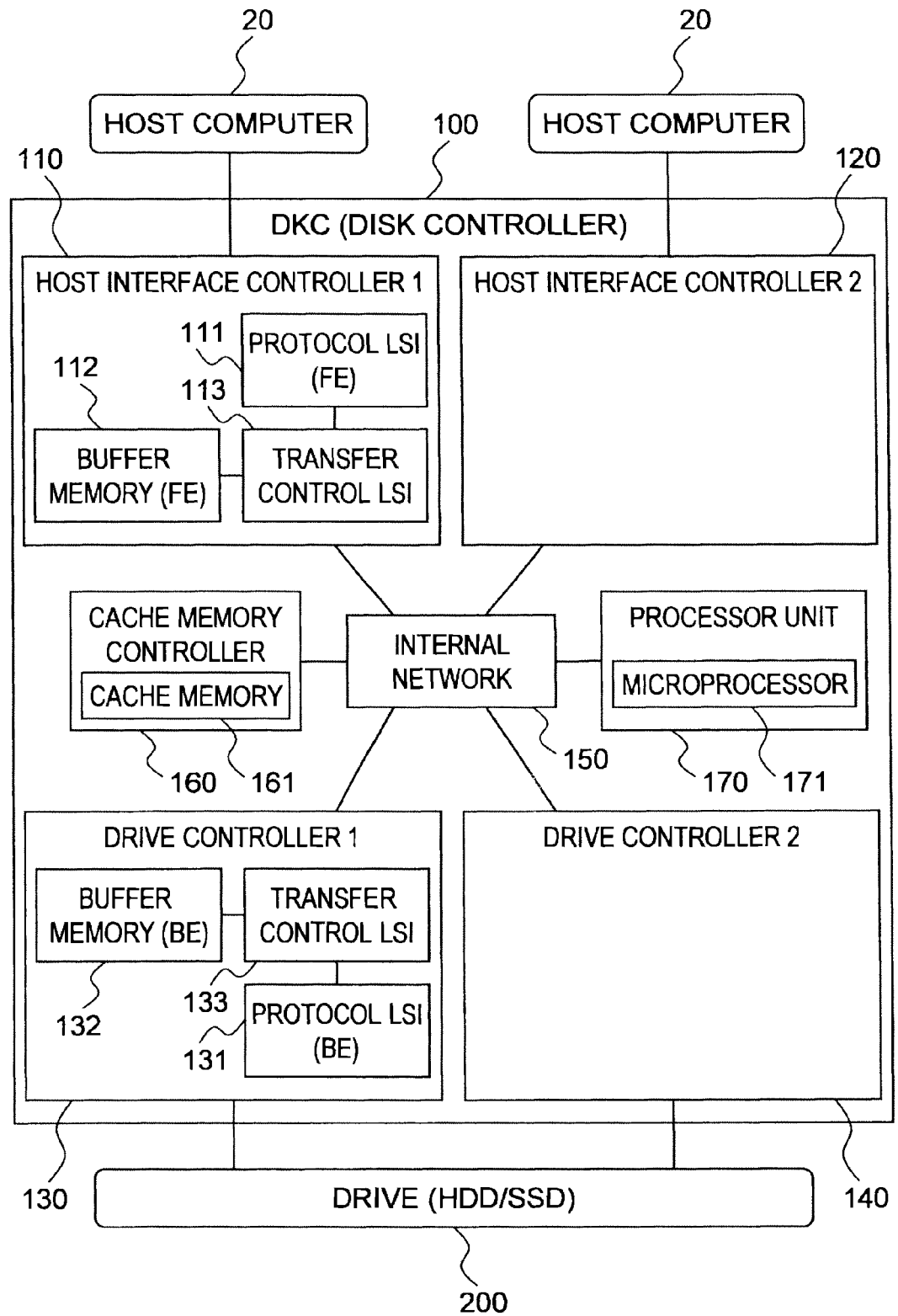
FIG. 2 is a block diagram showing an example of a configuration of a disk controller of this embodiment of the present invention.

FIG. 2 is a block diagram showing an example of a configuration of the disk controller 100 of the first embodiment.

The disk controller 100 includes a plurality of host interface controllers 110, 120, a plurality of drive controllers 130, 140, an internal network 150, one or more cache memory controllers 160 and one or more processor controllers 170. Although the disk controller 100 shown in FIG. 2 includes the plurality of host interface controllers 110, 120, the plurality of drive controllers 130, 140, the internal network 150, the one or more cache memory controllers 160 and the one or more processor controllers 170, the number of each of these various devices may be one, two or more.

The host interface controllers 110, 120 are interfaces connected to the host computers 20 and communicate with the host computers 20, for example, by a predetermined protocol such as FC, FCoE, iSCSI. The host interface controller 110 includes a protocol LSI (FE) 111, a buffer memory (FE) 112 and a transfer control LSI 113. The detailed configuration of the host interface controller 110 is described using FIG. 3.

The drive controllers 130, 140 are interfaces connected to the disk unit 200 and the like and communicate with the disk unit 200 and the like, for example, by a protocol such as FC, SATA or SCSI. The drive controller 130 includes a protocol LSI (BE) 131, a buffer memory (BE) 132 and a transfer control LSI 133. The detailed configuration of the drive controller 130 is described using FIG. 4.

The internal network 150 is composed of a switch (e.g. PCI express switch) for connecting respective parts in the disk controller 100.

The cache memory controller 160 includes a memory and a memory controller. A cache memory is a volatile memory for temporarily storing data requested to be written from a host computer before storage in the disk unit 200 or the like and, generally, a DRAM is used as such. Further, the cache memory stores control information for controlling the operation of the disk array apparatus 1.

The processor controller 170 includes a microprocessor and a local memory and controls the operation of the disk controller 100 by the microprocessor executing a program stored in the local memory.

Figure 3:
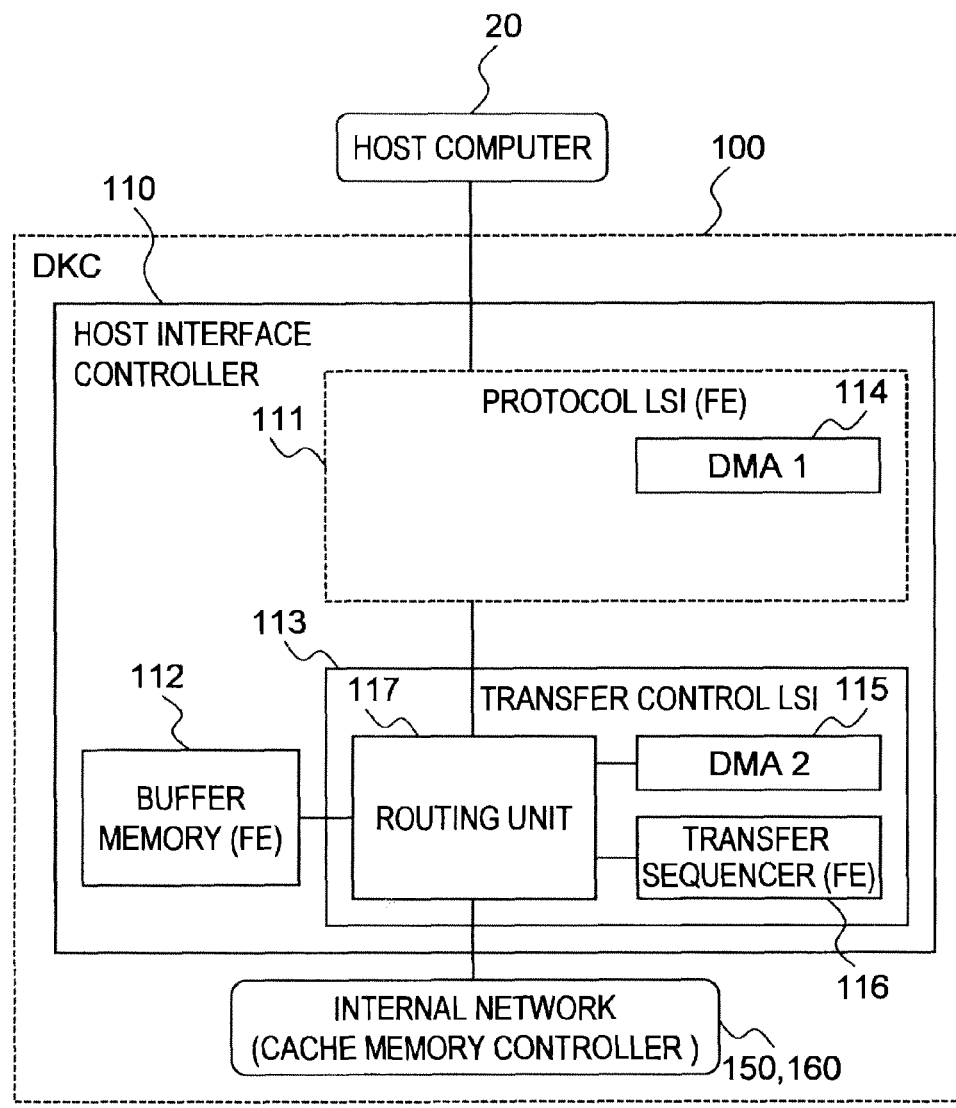
FIG. 3 is a block diagram showing an example of a configuration of a host interface controller of the first embodiment of the present invention.

FIG. 3 is a block diagram showing an example of a configuration of the host interface controller 110 of the first embodiment.

The host interface controller 110 includes the protocol LSI (FE) 111, the buffer memory (FE) 112 and the transfer control LSI 113.

The protocol LSI (FE) 111 converts a protocol used for communication with the host computer 20 and a communication protocol in the disk controller 100.

The protocol LSI (FE) 111 includes a DMA controller 114 and transfers data transmitted from the host computer 20 (e.g. data stored in an unillustrated reception buffer) to the buffer memory (FE) 112 and data stored in the buffer memory (FE) 112 to the host computer 20 (e.g. unillustrated transmission buffer).

The buffer memory (FE) 112 temporarily stores data input to the host interface controller 110.

The transfer control LSI 113 includes a DMA controller 115, a transfer sequencer (FE) 116 and a routing unit 117.

The DMA controller 115 transfers data stored in the buffer memory (FE) 112 to the cache memory controller 160 via the internal network 150 and data stored in the cache memory controller 160 to the buffer memory (FE) 112 via the internal network 150.

The transfer sequencer (FE) 116 is composed of a small-scale microprocessor and a memory and requests data transfers to the DMA controllers 114 and 115 based on an instruction from a processor unit 170.

The routing unit 117 is composed of a switch for connecting respective parts in the host interface controller 110.

Although the host interface controller 110 has been described above, the other host interface controller (e.g. 120) has the same configuration.

Figure 4:
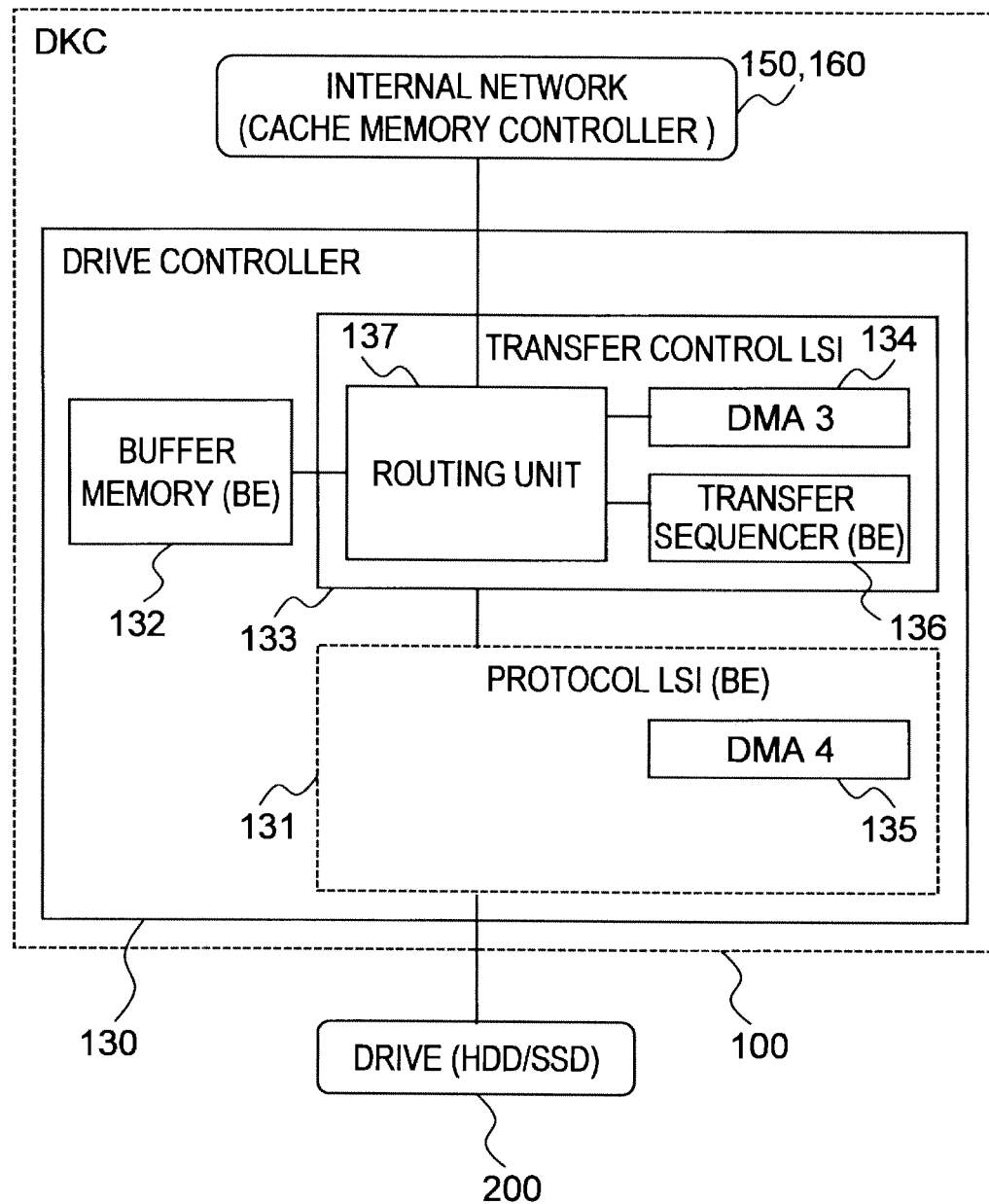
FIG. 4 is a block diagram showing an example of a configuration of a drive controller of the first embodiment of the present invention.

FIG. 4 is a block diagram showing an example of a configuration of the drive controller 130 of the first embodiment.

The drive controller 130 includes a protocol LSI (BE) 131, the buffer memory (BE) 132 and the transfer control LSI 133.

The protocol LSI (BE) 131 converts a protocol used for communication with the disk unit 200 (storage device) and a communication protocol in the disk controller 100.

The protocol LSI (FE) 131 includes a DMA controller 135 and transfers data transmitted from the disk unit 200 (e.g. data stored in a buffer memory in the storage device) to the buffer memory (BE) 132 and data stored in the buffer memory (BE) 132 to the disk unit 200 (e.g. buffer memory in the storage device).

The buffer memory (BE) 132 temporarily stores data input to the drive controller 130.

The transfer control LSI 133 includes a DMA controller 134, a transfer sequencer (BE) 136 and a routing unit 137.

The DMA controller 134 transfers data stored in the buffer memory (BE) 132 to the cache memory controller 160 via the internal network 150 and data stored in the cache memory controller 160 to the buffer memory (BE) 132 via the internal network 150.

The transfer sequencer (BE) 136 is composed of a small-scale microprocessor and a memory and requests data transfers to the DMA controllers 134 and 135 based on an instruction from the processor unit 170.

The routing unit 137 is composed of a switch for connecting respective parts in the drive controller 130.

Although the drive controller 130 has been described above, the other drive controller (e.g. 140) has the same configuration.

Figure 22:
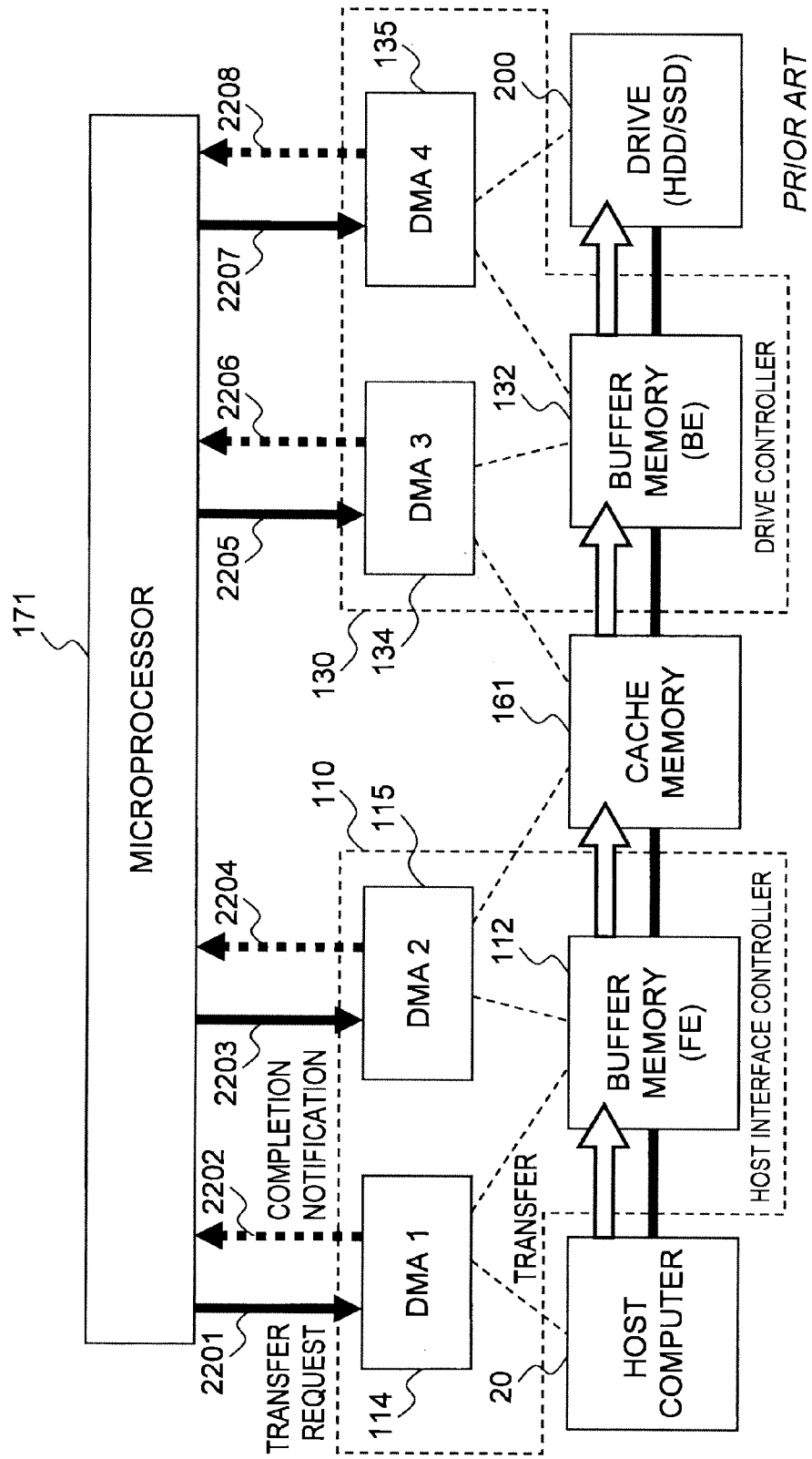
FIG. 22 is a diagram of a transfer of write data of the conventional disk array apparatus.
Figure 23:
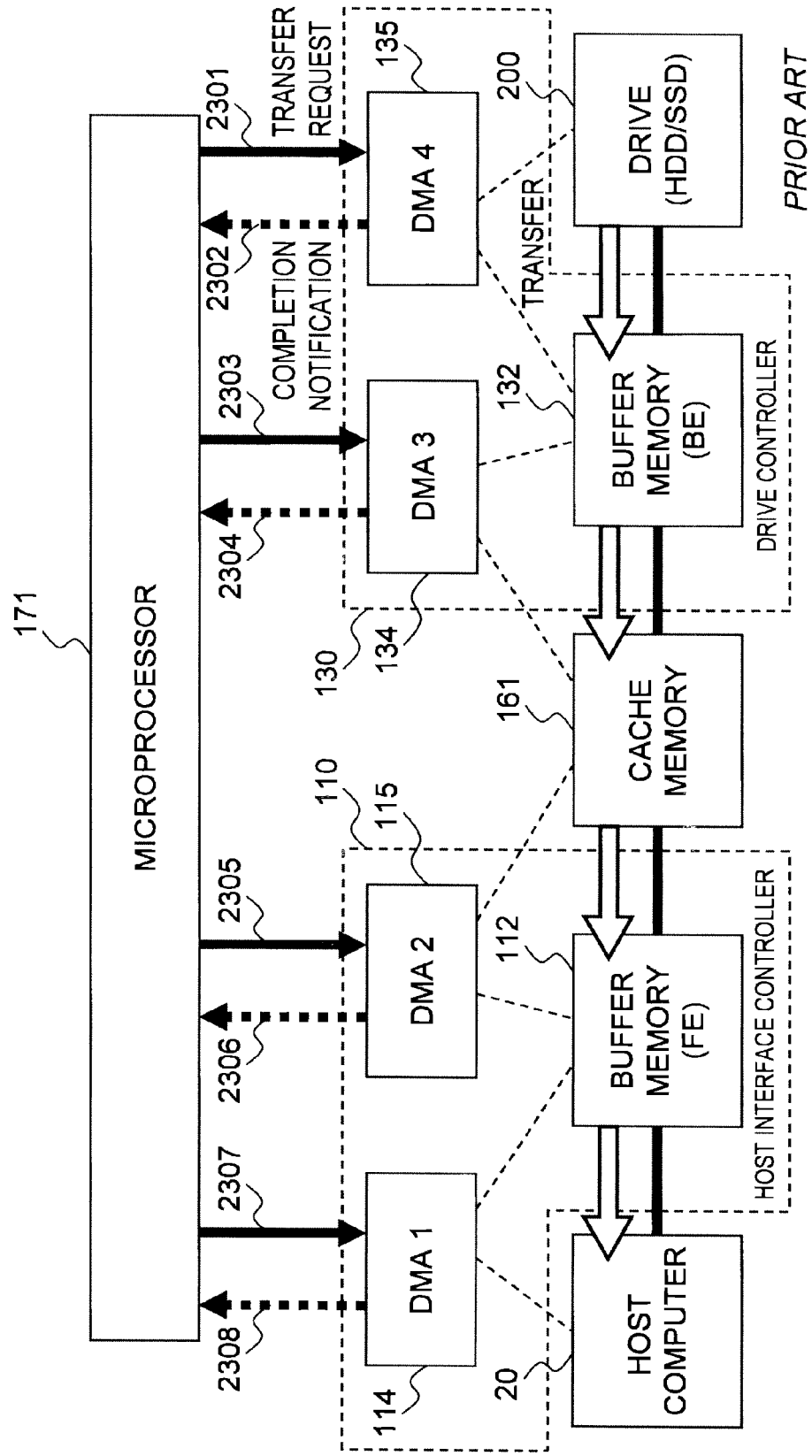
FIG. 23 is a diagram of a transfer of recd data of the conventional disk array apparatus.

Here, the transfer of data of a conventional disk array apparatus is described using FIGS. 22 and 23.

FIG. 22 is a diagram of the transfer of data of the conventional disk array apparatus showing an example of the transfer of write data from a host computer 20 to a disk unit 200.

A microprocessor 171 instructs the transfer of data to respective DMA controllers by transmitting data transfer requests 2201, 2203, 2205 and 2207 to DMA controllers 114, 115 of a host interface controller 110 and DMA controllers 134, 135 of a drive controller 130.

Specifically, the microprocessor 171 transmits the transfer request 2201 to the DMA controller 114 by writing DMA control parameters (address of a transfer source, address of a transfer destination, length of data to be transferred, transfer path, protection code, end status storage address) for the transfer of data transmitted from the host computer 20 (actually, data stored in an unillustrated reception buffer) to a buffer memory (FE) 112 of the host interface controller 110 in a predetermined address of a local memory. The transfer request 2201 to the DMA controller 114 includes the address where the DMA control parameters are stored and an identifier of a requestor (microprocessor 171).

Note that since the memories mounted in the disk array apparatus shown in FIG. 22 is mapped in a common address space, the memory to be accessed can be identified by designating an address.

When receiving the data transfer request 2201 from the microprocessor 171, the DMA controller 114 transfers the data transmitted from the host computer 20 and stored in the reception buffer to the buffer memory (FE) 112 of the host interface controller 110. Specifically, when receiving the transfer request 2201, the DMA controller 114 obtains the control parameters (address of the transfer source, address of the transfer destination, length of data to be transferred, transfer path, protection code, end status storage address) from the address designated by the transfer request 2201 and transfers the data between the memories in accordance with the obtained control parameters.

When the data transfer to the buffer memory (FE) 112 is completed, the DMA controller 114 transmits a completion notification 2202 to the microprocessor 171. Specifically, the DMA controller 114 notifies the completion of the data transfer to the requestor identified by the identifier designated by the transfer request 2201.

When receiving the completion notification 2202 of the data transfer from the DMA controller 114, the microprocessor 171 transmits the transfer request 2203 to transfer the data stored in the buffer memory (FE) 112 to a cache memory 161 to the DMA controller 115 that controls the next data transfer.

When receiving the data transfer request 2203 from the microprocessor 171, the DMA controller 115 transfers the data stored in the buffer memory (FE) 112 to the cache memory 161. When the data transfer from the buffer memory (FE) 112 to the cache memory 161 is completed, the DMA controller 115 transmits a completion notification 2204 to the microprocessor 171.

When receiving the completion notification 2204 of the data transfer from the DMA controller 115, the microprocessor 171 transmits the transfer request 2205 to transfer the data stored in the cache memory 161 to a buffer memory (BE) 132 of the drive controller 130 to the DMA controller 134 of the drive controller 130 that controls the next data transfer.

When receiving the data transfer request 2205 from the microprocessor 171, the DMA controller 134 transfers the data stored in the cache memory 161 to the buffer memory (BE) 132. When the data transfer from the cache memory 161 to the buffer memory (BE) 132 is completed, the DMA controller 134 transmits a completion notification 2206 to the microprocessor 171.

When receiving the completion notification 2206 of the data transfer from the DMA controller 134, the microprocessor 171 transmits the transfer request 2207 to transfer the data stored in the buffer memory (BE) 132 to the disk unit 200 to the DMA controller 135 that controls the next data transfer.

When receiving the data transfer request 2207 from the microprocessor 171, the DMA controller 135 transfers the data stored in the buffer memory (BE) 132 to the disk unit 200 (e.g. buffer memory in the storage device). When the data transfer from the buffer memory (BE) 132 is completed, the DMA controller 135 transmits a completion notification 2208 to the microprocessor 171.

FIG. 23 is a diagram of the transfer of data of the conventional disk array apparatus showing an example of the transfer of read data from the disk unit 200 to the host computer 20.

The microprocessor 171 instructs data transfers to the respective DMA controllers by transmitting data transfer requests 2301, 2303, 2305 and 2307 to the DMA controllers 134, 135 of the drive controller 130 and the DMA controllers 114, 115 of the host interface controller 110.

Specifically, the microprocessor 171 transmits the transfer request 2301 to the DMA controller 135 by writing DMA control parameters (address of a transfer source, address of a transfer destination, length of data to be transferred, transfer path, protection code, end status storage address) for the transfer of data stored in the disk unit 200 to the buffer memory (BE) 132 of the drive controller 130 in a predetermined address of the local memory. The transfer request 2301 to the DMA controller 135 includes the address where the DMA control parameters are stored and an identifier of a requestor (microprocessor 171) similar to the transfer request 2201 described above.

When receiving the data transfer request 2301 from the microprocessor 171, the DMA controller 135 transfers the data from the disk unit 200 (e.g. buffer memory in the storage device) to the buffer memory (BE) 132. Specifically, when receiving the transfer request 2301, the DMA controller 135 obtains the control parameters (address of the transfer source, address of the transfer destination, length of data to be transferred, transfer path, protection code, end status storage address) from the address designated by the transfer request 2301 and transfers the data between the memories in accordance with the obtained control parameters.

When the data transfer to the buffer memory (BE) 132 is completed, the DMA controller 135 transmits a completion notification 2302 to the microprocessor 171. Specifically, the DMA controller 135 notifies the completion of the data transfer to the requestor identified by the identifier designated by the transfer request 2301.

When receiving the completion notification 2302 of the data transfer from the DMA controller 135, the microprocessor 171 transmits the transfer request 2303 to transfer the data stored in the buffer memory (BE) 132 to the cache memory 161 to the DMA controller 134 that controls the next data transfer.

When receiving the data transfer request 2303 from the microprocessor 171, the DMA controller 134 transfers the data stored in the buffer memory (BE) 132 to the cache memory 161. When the data transfer from the buffer memory (BE) 132 to the cache memory 161 is completed, the DMA controller 134 transmits a completion notification 2304 to the microprocessor 171.

When receiving the completion notification 2304 of the data transfer from the DMA controller 134, the microprocessor 171 transmits the transfer request 2305 to transfer the data stored in the cache memory 161 to the buffer memory (FE) 112 of the host interface controller 110 to the DMA controller 115 that controls the next data transfer.

When receiving the data transfer request 2305 from the microprocessor 171, the DMA controller 115 transfers the data stored in the cache memory 161 to the buffer memory (FE) 112. Thereafter, when the data transfer from the cache memory 161 to the buffer memory (FE) 112 is completed, the DMA controller 115 transmits a completion notification 2306 to the microprocessor 171.

When receiving the completion notification 2306 of the data transfer from the DMA controller 115, the microprocessor 171 transmits the transfer request 2307 to transfer the data stored in the buffer memory (FE) 112 to the host computer 20 to the DMA controller 114 that controls the next data transfer.

When receiving the data transfer request 2307 from the microprocessor 171, the DMA controller 114 transfers the data stored in the buffer memory (FE) 112 to an unillustrated transmission buffer for the transmission to the host computer 20. Thereafter, when the data transfer from the buffer memory (FE) 112 is completed, the DMA controller 114 transmits a completion notification 2308 to the microprocessor 171.

As shown in FIGS. 22 and 23, in the case of the conventional disk array apparatus using no transfer sequencer, the microprocessor 171 has transmitted the transfer request to the DMA controller that controls each transfer every time data is transferred between the memories. Thus, a load on the microprocessor was heavy. Further, when receiving the completion notification of the data transfer from the DMA controller, the microprocessor 171 switches the process for processing the completion notification and the load on the microprocessor 171 has been increased by the switching overhead of the process.

Figure 5:
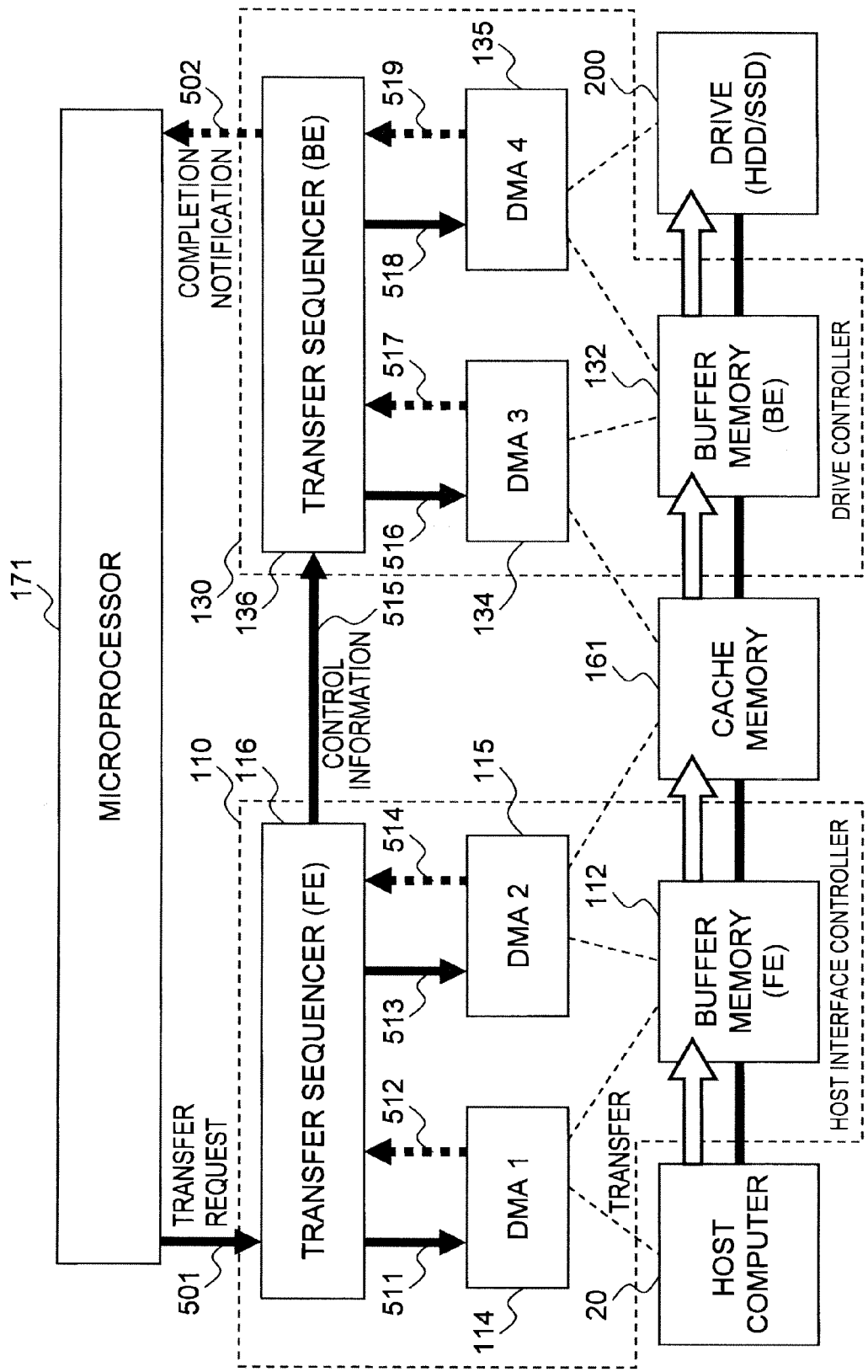
FIG. 5 is a diagram showing a transfer of write data of the disk array apparatus of the first embodiment of the present invention.

FIG. 5 is a diagram of the transfer of data of the disk array apparatus of the first embodiment showing an example of the transfer of write data from the host computer 20 to the disk unit 200.

The microcomputer 171 transmits a data transfer request 501 to the transfer sequencer (FE) 116 of the host interface controller 110, instructs data transfers to the DMA controllers 114, 115 and instructs data transfers to the DMA controllers 134, 135 via the transfer sequencer (BE) 136 of the drive controller 130.

First, the microcomputer 171 assembles a transfer sequence used to transfer data transmitted from the host computer 20 to the buffer memory in the storage device of the disk unit 200 and transmits the transfer request 501 including this sequence to the transfer sequencer (FE) 116.

Specifically, the microcomputer 171 transmits the transfer request 501 to the transfer sequencer (FE) 116 after writing DMA control parameters (address of a transfer source, address of a transfer destination, length of data to be transferred, transfer path, protection code, end status storage address) for the transfer of the data transmitted from the host computer 20 to the storage device of the disk unit 200 via the respective memories in a predetermined address of the buffer memory (FE) 112 of the host interface controller 110. The transfer request 501 to the transfer sequencer (FE) 116 includes an identifier of a DMA controller which is to be requested the data transfer, the data transfer request to each of the DAM controllers and an identifier of a requestor (microprocessor 171) as successive DMA start-up parameters.

Note that since the memories mounted in the disk array apparatus of this embodiment is mapped in a common address space, the memory to be accessed can be identified by designating an address.

When receiving the transfer request 501, the transfer sequencer (FE) 116 extracts the identifier of the DMA controller which is to be requested the data transfer and information of the data transfer request to each of the DAM controllers from the received transfer request 501, and generates transfer requests 511, 513 to be transmitted to the DMA controllers 114, 115 in accordance with the obtained control parameters. The transfer requests 511, 513 to the DMA controllers 114, 115 include the address where the DMA control parameters are stored and an identifier of a requestor (transfer sequencer (FE) 116).

Then, the transfer sequencer (FE) 116 transmits the transfer request 511 to transfer the data transmitted from the host computer 20 (actually, data stored in the unillustrated reception buffer) to the buffer memory (FE) 112 of the host interface controller 110 to the DMA controller 114.

When receiving the data transfer request 511 from the transfer sequencer (FE) 116, the DMA controller 114 transfers the data transmitted from the host computer 20 and stored in the reception buffer to the buffer memory (FE) 112 of the host interface controller 110. Specifically, when receiving the transfer request 511, the DMA controller 114 obtains the control parameters (address of the transfer source, address of the transfer destination, length of data to be transferred, transfer path, protection code, end status storage address) from the address designated by the transfer request 511 and transfers the data between the memories in accordance with the obtained control parameters.

When the data transfer to the buffer memory (FE) 112 is completed, the DMA controller 114 transmits a completion notification 512 to the transfer sequencer (FE) 116. Specifically, the DMA controller 114 notifies the completion of the data transfer to the requestor identified by the identifier designated by the transfer request 511.

When receiving the completion notification 512 of the data transfer from the DMA controller 114, the transfer sequencer (FE) 116 transmits the transfer request 513 to transfer the data stored in the buffer memory (FE) 112 to a cache memory 161 to the DMA controller 115 that controls the next data transfer.

When receiving the data transfer request 513 from the transfer sequencer (FE) 116, the DMA controller 115 transfers the data stored in the buffer memory (FE) 112 to the cache memory 161. When the data transfer from the buffer memory (FE) 112 to the cache memory 161 is completed, the DMA controller 115 transmits a completion notification 514 to the transfer sequencer (FE) 116.

When receiving the completion notification 514 of the data transfer from the DMA controller 115, the transfer sequencer (FE) 116 transmits control information 515 for controlling the subsequent transfers to the transfer sequencer (BE) 136 of the drive controller 130 that controls the next control.

When receiving the control information 515 from the transfer sequencer (FE) 116, the transfer sequencer (BE) 136 transmits a transfer request 516 to transfer the data stored in the cache memory 161 to the buffer memory (BE) 132 of the drive controller 130 to the DMA controller 134 that controls the next transfer.

When receiving the data transfer request 516 from the transfer sequencer (BE) 136, the DMA controller 134 transfers the data stored in the cache memory 161 to the buffer memory (BE) 132. When the data transfer from the cache memory 161 to the buffer memory (BE) 132 is completed, the DMA controller 134 transmits a completion notification 517 to the transfer sequencer (BE) 136.

When receiving the completion notification 517 of the data transfer from the DMA controller 134, the transfer sequencer (BE) 136 transmits a transfer request 518 to transfer the data stored in the buffer memory (BE) 132 to the disk unit 200 to the DMA controller 135 that controls the next data transfer.

When receiving the data transfer request 518 from the transfer sequencer (BE) 136, the DMA controller 135 transfers the data stored in the buffer memory (BE) 132 to the disk unit 200 (e.g. buffer memory in the storage device). When the data transfer from the buffer memory (BE) 132 is completed, the DMA controller 135 transmits a completion notification 519 of the data transfer to the transfer sequencer (BE) 136.

When receiving the completion notification 519 of the data transfer from the DMA controller 135, the transfer sequencer (BE) 136 transmits a completion notification 502 of the data transfer to the disk unit 200 to the microprocessor 171. Actually, the transfer sequencer (BE) 136 writes an end status in the address designated by the transfer request 511 and the microprocessor 171 notifies the completion of the data transfer by checking data in this address at a predetermined timing.

Figure 6:
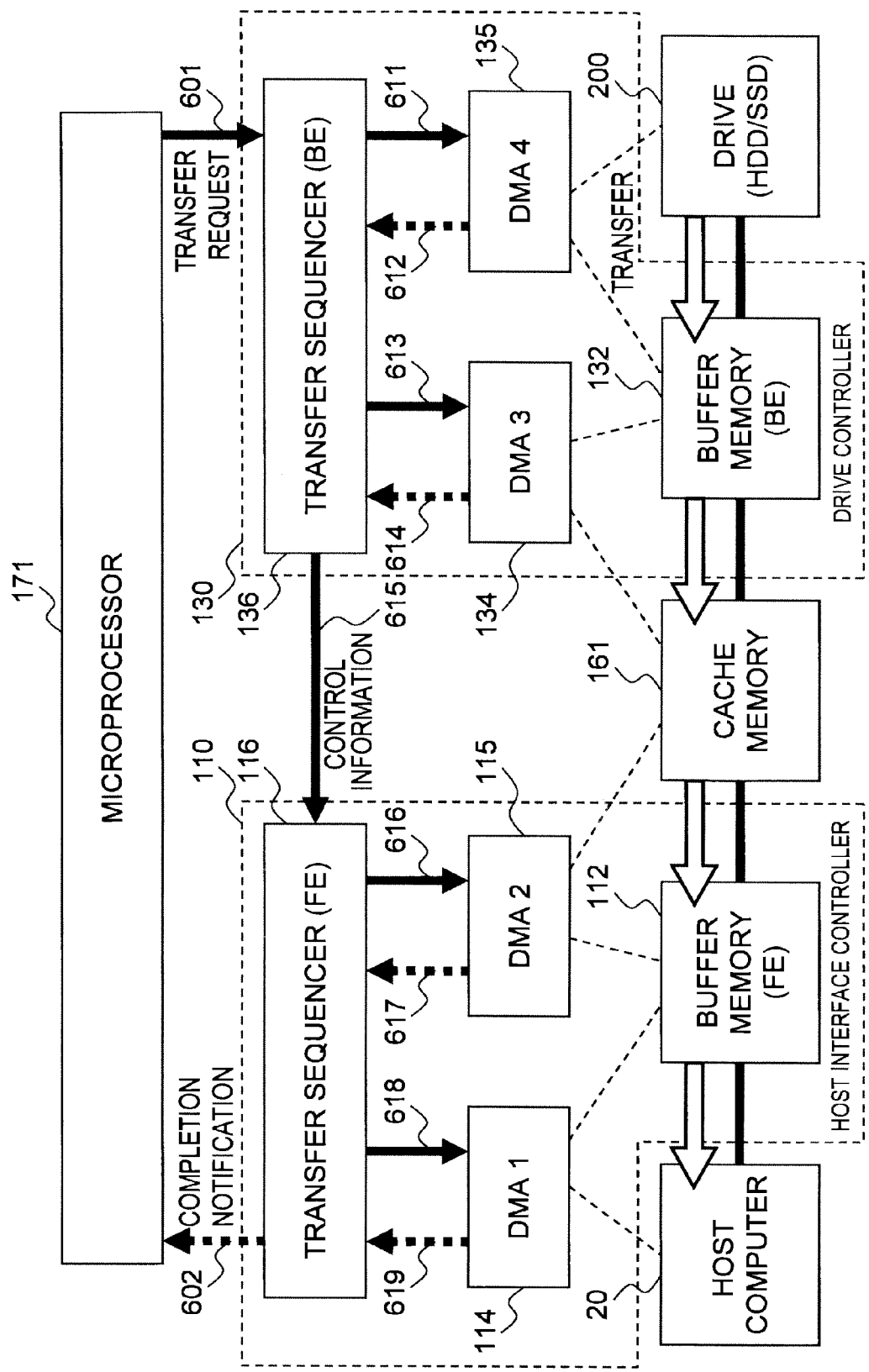
FIG. 6 is a diagram showing a transfer of read data of the disk array apparatus of the first embodiment of the present invention.

FIG. 6 is a diagram of the transfer of data of the disk array apparatus of the first embodiment showing an example of the transfer of read data from the disk unit 200 to the host computer 20.

The microcomputer 171 transmits a data transfer request 601 to the transfer sequencer (BE) 136 of the drive controller 130, instructs data transfers to the DMA controllers 134, 135 and instructs data transfers to the DMA controllers 114, 115 via the transfer sequencer (FE) 116 of the host interface controller 110.

First, the microcomputer 171 assembles a transfer sequence used to transfer data stored in the buffer memory in the storage device of the disk unit 200 to the host computer 20 and transmits the transfer request 601 including this sequence to the transfer sequencer (BE) 136.

Specifically, the microprocessor 171 transmits the transfer request 601 to the transfer sequencer (BE) 136 after writing DMA control parameters (address of a transfer source, address of a transfer destination, length of data to be transferred, transfer path, protection code, end status storage address) for the transfer of data stored in the disk unit 200 (e.g. buffer memory in the storage device) to the storage device of the host computer 20 via the respective memories in a predetermined address of the buffer memory (BE) 132 of the drive controller 130. The transfer request 601 to the transfer sequencer (BE) 136 includes an identifier of the DMA controller which is to be requested the data transfer, the data transfer request to each of the DAM controllers and an identifier of a requestor (microprocessor 171) as successive DMA start-up parameters similar to the transfer request 501 described above.

When receiving the data transfer request 801, the transfer sequencer (BE) 136 extracts the identifier of the DMA controller which is to be requested the data transfer and information of the data transfer request to each of the DAM controllers from the received transfer request 801, and generates transfer requests 611, 613 to be transmitted to the DMA controllers 134, 135 in accordance with the obtained control parameters. The transfer requests 611, 613 to the DMA controllers 134, 135 include the address where the DMA control parameters are stored and an identifier of a requestor (transfer sequencer (BE) 136).

Then, the transfer sequencer (BE) 136 transmits the transfer request 611 to transfer the data stored in the disk unit 200 (e.g. buffer memory in the storage device) to the buffer memory (BE) 132 of the drive controller 130 to the DMA controller 135.

When receiving the data transfer request 811 from the transfer sequencer (BE) 136, the DMA controller 135 transfers the data from the disk unit 200 to the buffer memory (BE) 132. Specifically, when receiving the transfer request 611, the DMA controller 135 obtains the control parameters (address of the transfer source, address of the transfer destination, length of data to be transferred, transfer path, protection code, end status storage address) from the address designated by the transfer request 611 and transfers the data between the memories in accordance with the obtained control parameters.

When the data transfer to the buffer memory (BE) 132 is completed, the DMA controller 135 transmits a completion notification 612 to the transfer sequencer (BE) 136. Specifically, the DMA controller 135 notifies the completion of the data transfer to the requestor identified by the identifier designated by the transfer request 611.

When receiving the completion notification 612 of the data transfer from the DMA controller 135, the transfer sequencer (BE) 136 transmits the transfer request 613 to transfer the data stored in the buffer memory (BE) 132 to the cache memory 161 to the DMA controller 134 that controls the next data transfer.

When receiving the data transfer request 613 from the transfer sequencer (BE) 136, the DMA controller 134 transfers the data stored in the buffer memory (BE) 132 to the cache memory 161. When the data transfer from the buffer memory (BE) 132 to the cache memory 161 is completed, the DMA controller 134 transmits a completion notification 614 to the transfer sequencer (BE) 136.

When receiving the completion notification 814 of the data transfer from the DMA controller 134, the transfer sequencer (BE) 136 transmits control information 615 for controlling the subsequent transfers to the transfer sequencer (FE) 116 of the host interface controller 110 that controls the next data transfer.

When receiving the control information 615 from the transfer sequencer (BE) 136, the transfer sequencer (FE) 116 transmits a transfer request 616 to transfer the data stored in the cache memory 161 to the buffer memory (FE) 112 of the host interface controller 110 to the DMA controller 115 that controls the next data transfer.

When receiving the data transfer request 616 from the transfer sequencer (FE) 116, the DMA controller 115 transfers the data stored in the cache memory 161 to the buffer memory (FE) 112. Thereafter, when the data transfer from the cache memory 161 to the buffer memory (FE) 112 is completed, the DMA controller 115 transmits a completion notification 617 to the transfer sequencer (FE) 116.

When receiving the completion notification 617 of the data transfer from the DMA controller 115, the transfer sequencer (FE) 116 transmits a transfer request 618 to transfer the data stored in the buffer memory (FE) 112 to the host computer 20 to the DMA controller 114 that controls the next data transfer.

When receiving the data transfer request 618 from the transfer sequencer (FE) 116, the DMA controller 114 transfers the data stored in the buffer memory (FE) 112 to the unillustrated transmission buffer for the transmission to the host computer 20. Thereafter, when the data transfer from the buffer memory (FE) 112 is completed, the DMA controller 114 transmits a completion notification 619 to the transfer sequencer (FE) 116.

When receiving the completion notification 619 of the data transfer from the DMA controller 114, the transfer sequencer (FE) 116 transmits a completion notification 602 of the data transfer to the host computer 20 to the microprocessor 171. Actually, the transfer sequencer (FE) 116 writes an end status in the address designated by the transfer request 601 and the microprocessor 171 notifies the completion of the data transfer by checking data in this address at a predetermined timing.

Figure 7:
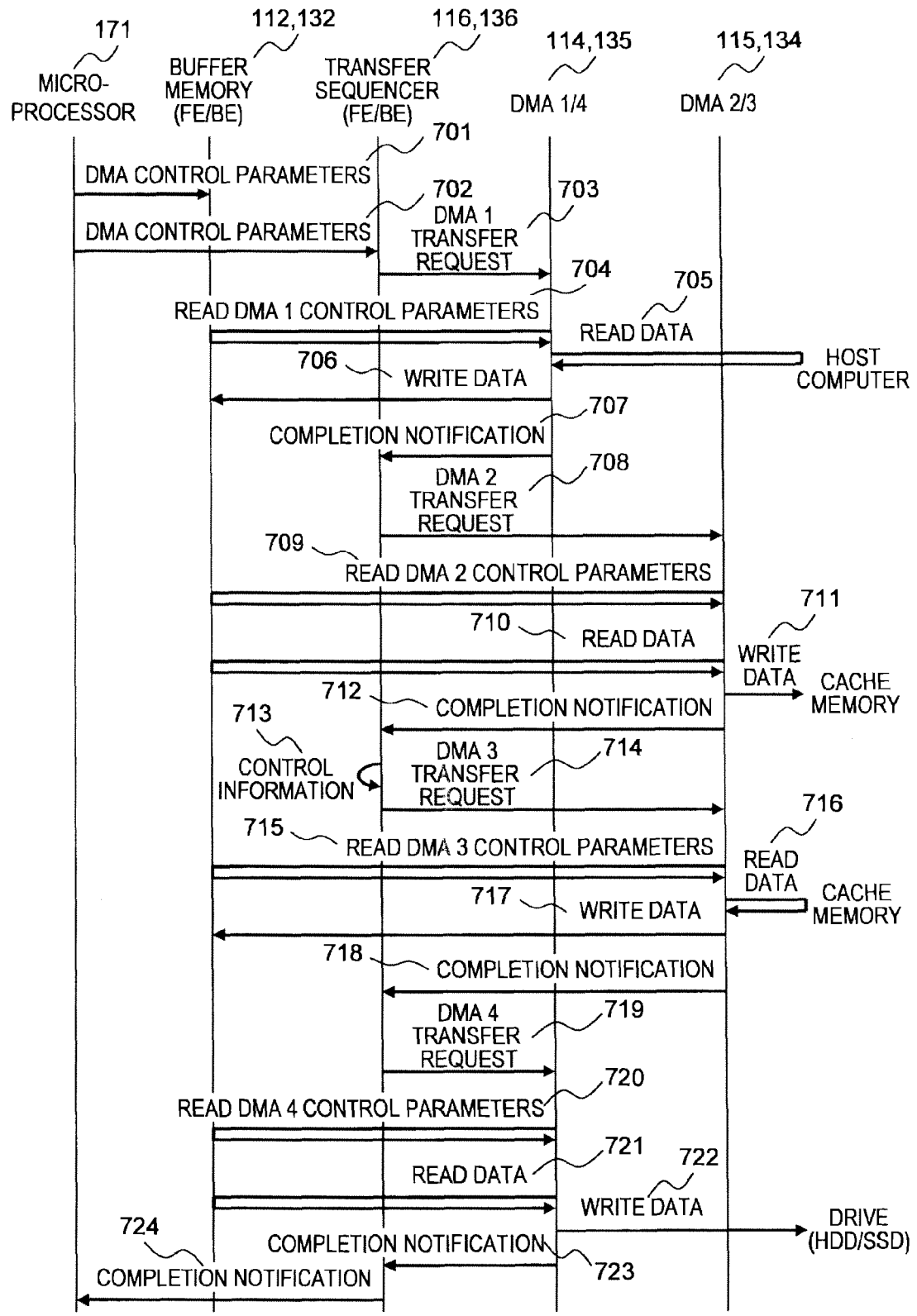
FIG. 7 is a sequence diagram showing a write data transfer control performed by DMA controllers of the first embodiment of the present invention.

FIG. 7 is a sequence diagram of controls of the DMA controllers by the transfer sequencers of the disk array apparatus of the first embodiment showing the procedure of the transfer of write data from the host computer 20 to the disk unit 200 shown in FIG. 5.

First, the microprocessor 171 generates the DMA control parameters for the transfer of the data transmitted from the host computer 20 and writes the generated DMA control parameters in a predetermined address of the buffer memory (FE) 112 of the host interface controller 110 (701). The DMA control parameters include the address of a transfer source, the address of a transfer destination, the length of data to be transferred, a transfer path, a protection code and an end status storage address.

Thereafter, the microprocessor 171 transmits DMA start-up parameters as the transfer request 501 to the transfer sequencer (FE) 116 (702). The DMA start-up parameters include an identifier of the DMA controller which is to be requested the data transfer, the data transfer request to each of the DAM controllers and an identifier of a requestor (microprocessor 171).

When receiving the transfer request 501 (DMA start-up parameters), the transfer sequencer (FE) 116 extracts the identifier of the DMA controller which is to be requested the data transfer and information of the data transfer request to each of the DAM controllers from the received DMA start-up parameters and generates the transfer request 511 to be transmitted to the DMA controller in accordance with the obtained DMA control parameters. The transfer request to the DMA controller includes the address where the DMA control parameters are stored and an identifier of a requestor (transfer sequencer (FE) 116). Thereafter, the transfer sequencer (FE) 116 transmits the generated transfer request 511 to the DMA controller 114 (703).

The DMA controller 114 obtains the control parameters (address of the transfer source, address of the transfer destination, length of data to be transferred, transfer path, protection code, end status storage address) from the address designated by the transfer request 511 from the transfer sequencer (FE) 116 (704).

Then, the DMA controller 114 reads the data transmitted from the host computer 20 and stored in the reception buffer in accordance with the obtained control parameters (705) and writes it in the buffer memory (FE) 112 of the host interface controller 110 (706).

Thereafter, the DMA controller 114 transmits the completion notification 512 to the requestor (transfer sequencer (FE) 116) identified by the identifier designated by the transfer request 511 (707).

When receiving the completion notification 512 of the data transfer from the DMA controller 114, the transfer sequencer (FE) 116 transmits the transfer request 513 to transfer the data stored in the buffer memory (FE) 112 to the cache memory 161 to the DMA controller 115 that controls the next data transfer (708).

The DMA controller 115 obtains the control parameters (address of the transfer source, address of the transfer destination, length of data to be transferred, transfer path, protection code, end status storage address) from the address designated by the transfer request 513 from the transfer sequencer (FE) 116 (709).

Then, the DMA controller 115 reads the data stored in the buffer memory (FE) 112 in accordance with the obtained control parameters (710) and writes it in the cache memory 161 (711).

Thereafter, the DMA controller 115 transmits the completion notification 514 to the requestor (transfer sequencer (FE) 116) identified by the identifier designated by the transfer request 513 (712).

When receiving the completion notification 514 of the data transfer from the DMA controller 115, the transfer sequencer (FE) 116 transmits the control information 515 for controlling the subsequent transfers to the transfer sequencer (BE) 136 of the drive controller 130 that controls the next data transfer (713).

When receiving the control information 515 from the transfer sequencer (FE) 116, the transfer sequencer (BE) 136 transmits the transfer request 516 to transfer the data stored in the cache memory 161 to the buffer memory (BE) 132 of the drive controller 130 to the DMA controller 134 that controls the next data transfer (714).

The DMA controller 134 obtains the control parameters (address of the transfer source, address of the transfer destination, length of data to be transferred, transfer path, protection code, end status storage address) from the address designated by the transfer request 516 from the transfer sequencer (BE)136 (715).

Then, the DMA controller 134 reads the data stored in the cache memory 161 in accordance with the obtained control parameters (716) and writes it in the buffer memory (BE) 132 (717).

Thereafter, the DMA controller 134 transmits the completion notification 517 to the requestor (transfer sequencer (BE) 136) identified by the identifier designated by the transfer request 516 (718).

When receiving the completion notification 517 of the data transfer from the DMA controller 134, the transfer sequencer (BE) 136 transmits the transfer request 518 to transfer the data stored in the buffer memory (BE) 132 to the disk unit 200 (e.g. buffer memory in the storage device) to the DMA controller 135 that controls the next data transfer (719).

The DMA controller 135 obtains the control parameters (address of the transfer source, address of the transfer destination, length of data to be transferred, transfer path, protection code, end status storage address) from the address designated by the transfer request 518 from the transfer sequencer (BE) 136 (720).

Then, the DMA controller 135 reads the data stored in the buffer memory (BE) 132 in accordance with the obtained control parameters (721) and writes it in the disk unit 200 (e.g. buffer memory in the storage device) (722).

Thereafter, the DMA controller 135 transmits the completion notification 519 to the requestor (transfer sequencer (BE) 136) identified by the identifier designated by the transfer request 518 (723).

When receiving the completion notification 519 of the data transfer from the DMA controller 135, the transfer sequencer (BE) 136 notifies the completion of the data transfer to the microprocessor 171 by writing an end status of the data transfer to the disk unit 200 in the address designated by the transfer request 501 (724).

Figure 8:
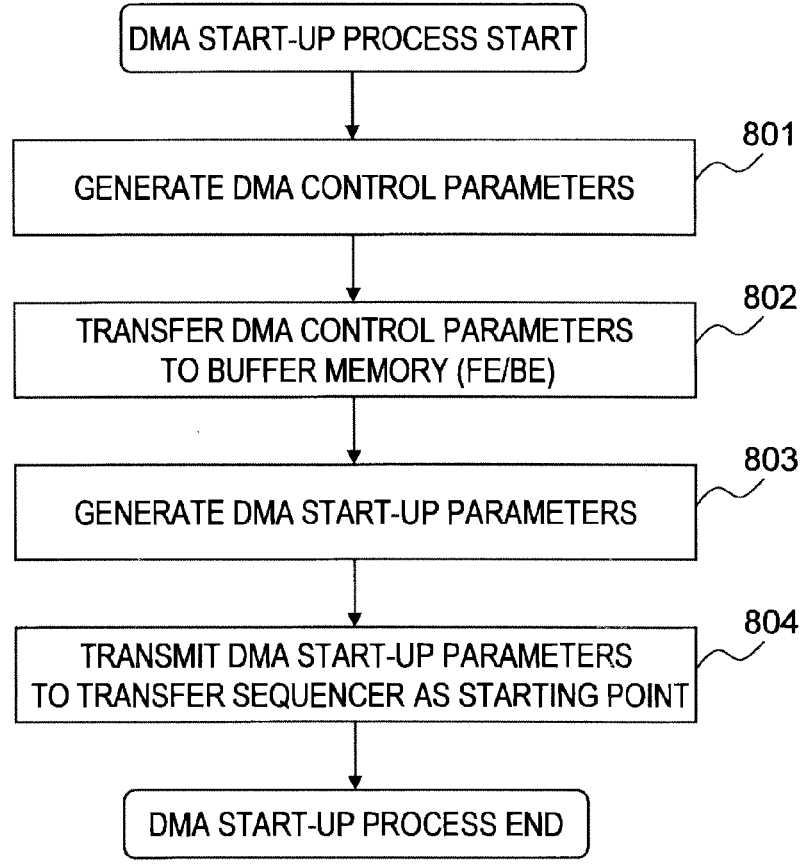
FIG. 8 is a flow chart of a DMA start-up process executed by the microprocessor of the first embodiment of the present invention.

FIG. 8 is a flow chart of a DMA start-up process executed by the microprocessor 171 of the first embodiment.

First, the microprocessor 171 generates the address of a transfer source, the address of a transfer destination, the length of data to be transferred, a transfer path, a protection code and an end status storage address as DMA control parameters (801).

Thereafter, the microprocessor 171 stores the generated DMA control parameters in a predetermined address of the buffer memory (FE) 112 of the host interface controller 110 or the buffer memory (BE) 132 of the drive controller 130 (802).

Further, the microprocessor 171 generates an identifier of the DMA controller which is to be requested the data transfer, the data transfer request to each of the DMA controllers, which includes the address where the DMA control parameters are stored and an identifier of a requestor (microprocessor 171), as DMA start-up parameters (803).

Thereafter, the microprocessor 171 transmits the generated DMA start-up parameters as a transfer request 501 to the transfer sequencer (FE) 116 that becomes a starting point of successive transfers (804).

Figure 9:
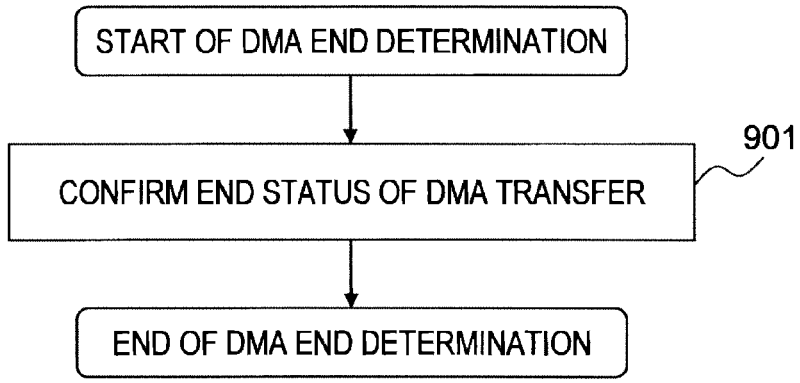
FIG. 9 is a flow chart of a DMA end determination process executed by the microprocessor of the first embodiment of the present invention.

FIG. 9 is a flow chart of a DMA end determination process executed by the microprocessor 171 of the first embodiment.

First, the microprocessor 171 confirms the end status storage address designated by the DMA control parameters at a predetermined timing (e.g. at predetermined time intervals) and confirms the status written by the transfer sequencer 116, 136 (901).

Note that the transfer sequencer 116, 136 that becomes an end point of successive transfers writes the end status (information indicating the end of the data transfer) in the end status storage address designated by the DMA control parameters as described above when receiving the completion notification of the data transfer from the DMA controller.

Figure 10:
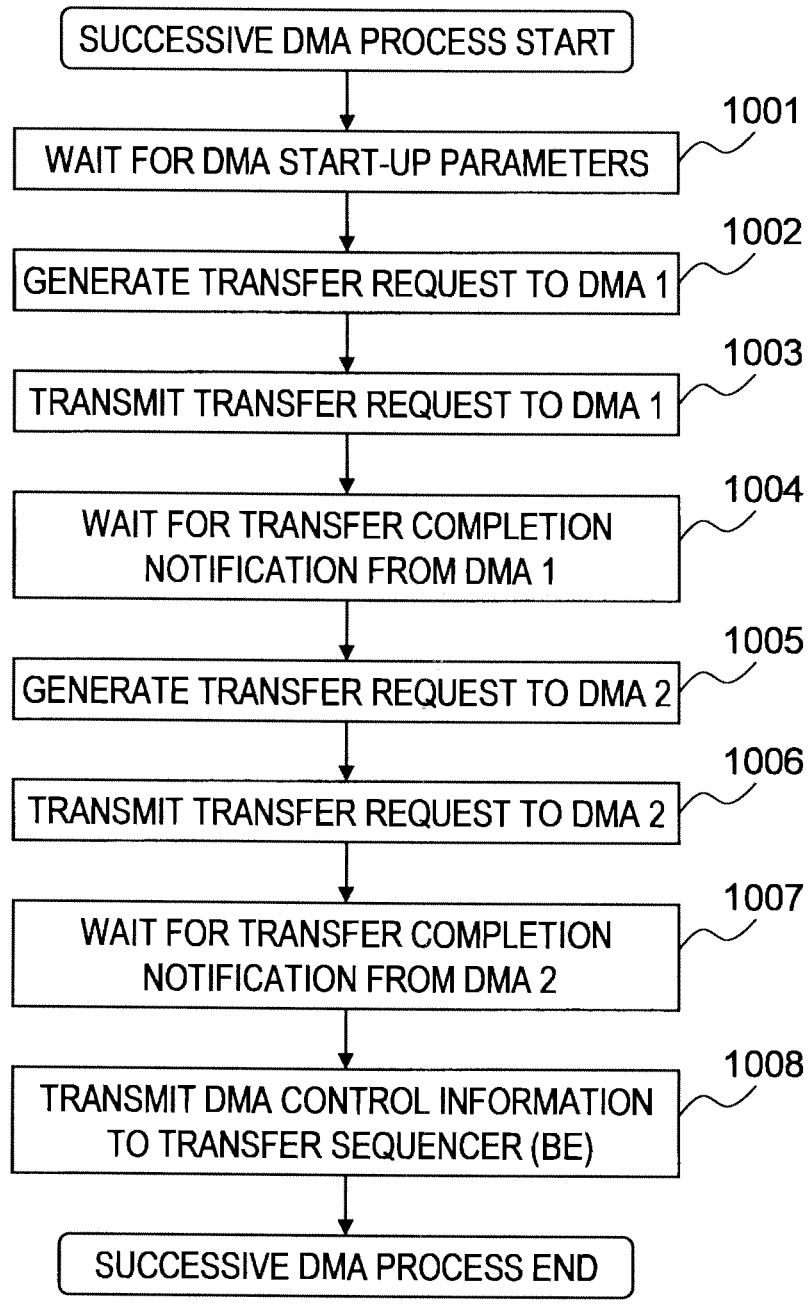
FIG. 10 is a flow chart of a successive DAM process executed by the transfer sequencer (FE) of the first embodiment of the present invention.

FIG. 10 is a flow chart of a successive DAM process of the first embodiment showing the process executed by the transfer sequencer (FE) 116 at the time of transferring write data from the host computer 20 to the disk unit 200 shown in FIG. 5.

First, the transfer sequencer (FE) 116 confirms whether the DMA start-up parameters have been written by the microprocessor 171 by checking a predetermined address of the local memory at a predetermined timing (e.g. at predetermined time intervals) (1001).

If the DMA start-up parameters have been written, the transfer sequencer (FE) 116 extracts the identifier of the DMA controller which is to be requested the data transfer and information of the data transfer request to each of the DAM controllers, which includes the address where the DMA control parameters are stored and an identifier of a requestor (microprocessor 171), from the DMA start-up parameters transferred from the microprocessor 171, and generates a transfer request to be transmitted to the DMA controller 114 in accordance with the obtained DMA control parameters (1002). The transfer request to be transmitted to the DMA controller includes parameters to start the DMA controller.

Then, the transfer sequencer (BE) 116 transmits the generated transfer request to the DMA controller 114 (1003).

When the requested data transfer is completed, the DMA controller transmits a completion notification to the transfer sequencer (FE) 116 by writing an end status in an address determined for each requestor (e.g. predetermined area of the local memory of the transfer sequencer (FE) 116). The transfer sequencer (FE) 116 waits for the completion notification of the data transfer from the DMA controller 114 while checking the predetermined address at a predetermined timing (e.g. at predetermined time intervals) (1004).

When receiving the completion notification of the data transfer from the DMA controller 114, the transfer sequencer (FE) 116 generates a transfer request to be transmitted to the DMA controller 115 that controls the next data transfer (1005). Then, the transfer sequencer (FE) 116 transmits the generated transfer request to the DMA controller 115 (1006).

The transfer sequencer (FE) 116 waits for a completion notification 712 of the data transfer from the DMA controller 115 (1007).

When receiving the completion notification of the data transfer from the DMA controller 114, the transfer sequencer (FE) 116 writes control information for controlling the subsequent transfers in the local memory of the transfer sequencer (BE) 136 of the drive controller 130 that controls the next data transfer and transmits the control information (1008). This control information includes the address where the DMA control parameters are stored and the identifier of the requestor similar to the DAM start-up parameters.

Figure 11:
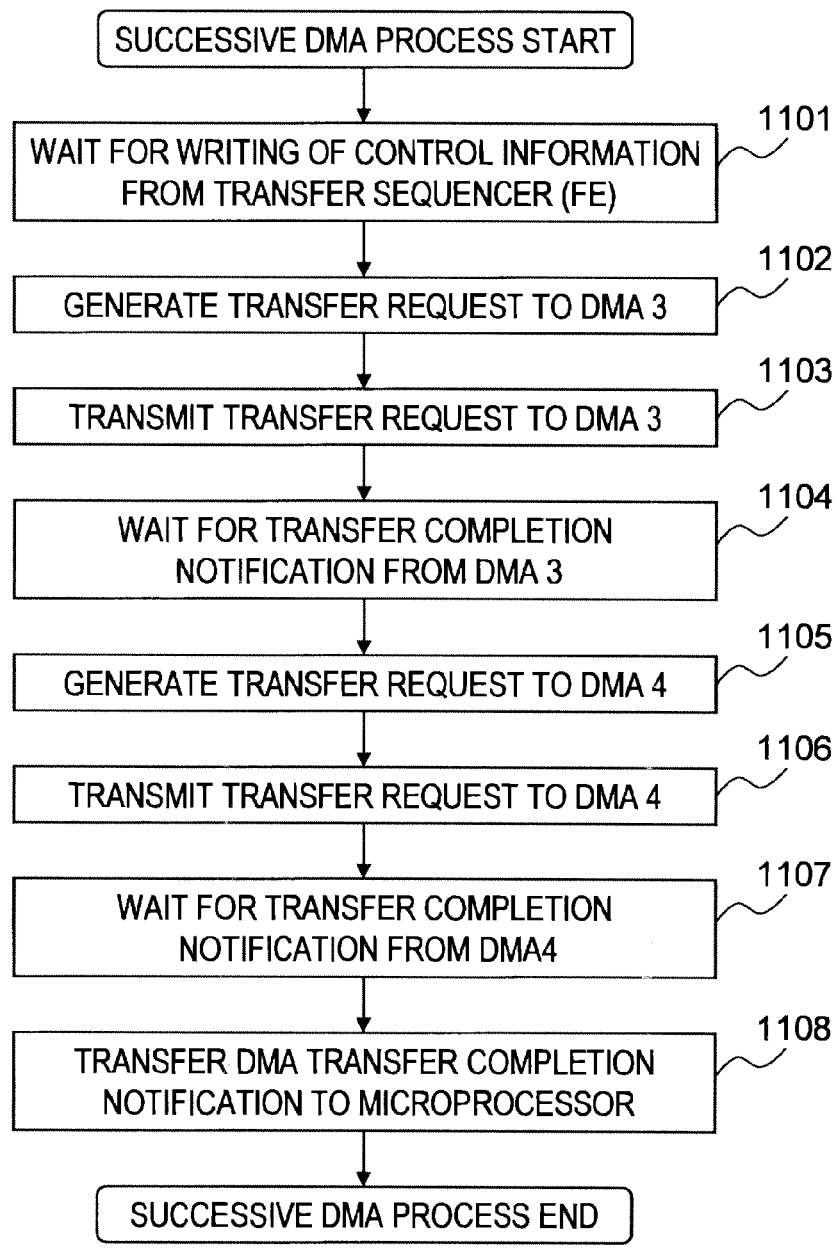
FIG. 11 is a flow chart showing a successive DMA process executed by the transfer sequencer (BE) of the first embodiment of the present invention.

FIG. 11 is a flow chart of a successive DMA process of the first embodiment showing the process executed by the transfer sequencer (BE) 136 at the time of transferring write data from the host computer 20 to the disk unit 200 shown in FIG. 5.

First, the transfer sequencer (BE) 136 confirms whether the control information has been written by the transfer sequencer (FE) 116 by checking a predetermined address of the local memory at a predetermined timing (e.g. at predetermined time intervals) (1101).

Thereafter, the transfer sequencer (BE) 136 extracts the identifier of the DMA controller which is to be requested the data transfer and information of the data transfer request to each of the DAM controllers, which includes the address where the DMA control parameters are stored and an identifier of a requestor (microprocessor 171), from the control information transferred from the transfer sequencer (FE) 116, and generates a transfer request to be transmitted to the DMA controller 134 in accordance with the obtained DMA control parameters (1102). The transfer request to be transmitted to the DMA controller includes parameters to start the DMA controller.

Then, the transfer sequencer (BE) 136 transmits the generated transfer request to the DMA controller 134 (1103).

When the requested data transfer is completed, the DMA controller transmits a completion notification to the transfer sequencer (BE) 136 by writing an end status in an address determined for each requestor (e.g. predetermined area of the local memory of the transfer sequencer (BE) 136). The transfer sequencer (BE) 136 waits for the completion notification of the data transfer from the DMA controller 134 while checking the predetermined address at a predetermined timing (e.g. at predetermined time intervals) (1104).

When receiving the completion notification of the data transfer from the DMA controller 134, the transfer sequencer (BE) 136 generates a transfer request to be transmitted to the DMA controller 135 that controls the next data transfer (1105). Then, the transfer sequencer (BE) 136 transmits the generated transfer request to the DMA controller 135 (1106).

The transfer sequencer (BE) 136 waits for a completion notification 712 of the data transfer from the DMA controller 135 (1107).

When receiving the completion notification of the data transfer from the DMA controller 135, the transfer sequencer (BE) 136 writes an end status of the data transfer to the disk unit 200 in the address designated by the DMA control parameters and notifies the completion of the data transfer to the microprocessor 171 (1108).

Since data are transferred between the memories using the transfer sequencers 116, 136 according to the first embodiment of the present invention as described above, the microprocessor 171 only transmits one transfer request to the transfer sequencer 116 or 136 and the load on the microprocessor 171 can be reduced. Further, since the microprocessor 171 only receives one transfer completion notification from the transfer sequencer 116 or 136, the switching overhead of the process for processing the completion notification becomes unnecessary and the load on the microprocessor 171 can be reduced.

<Second Embodiment>

Next, a second embodiment of the present invention is described. In the second embodiment, a cache-less transfer for transferring data while skipping the cache memory 161 is performed in the disk array apparatus 1 of the first embodiment described above.

Figure 12:
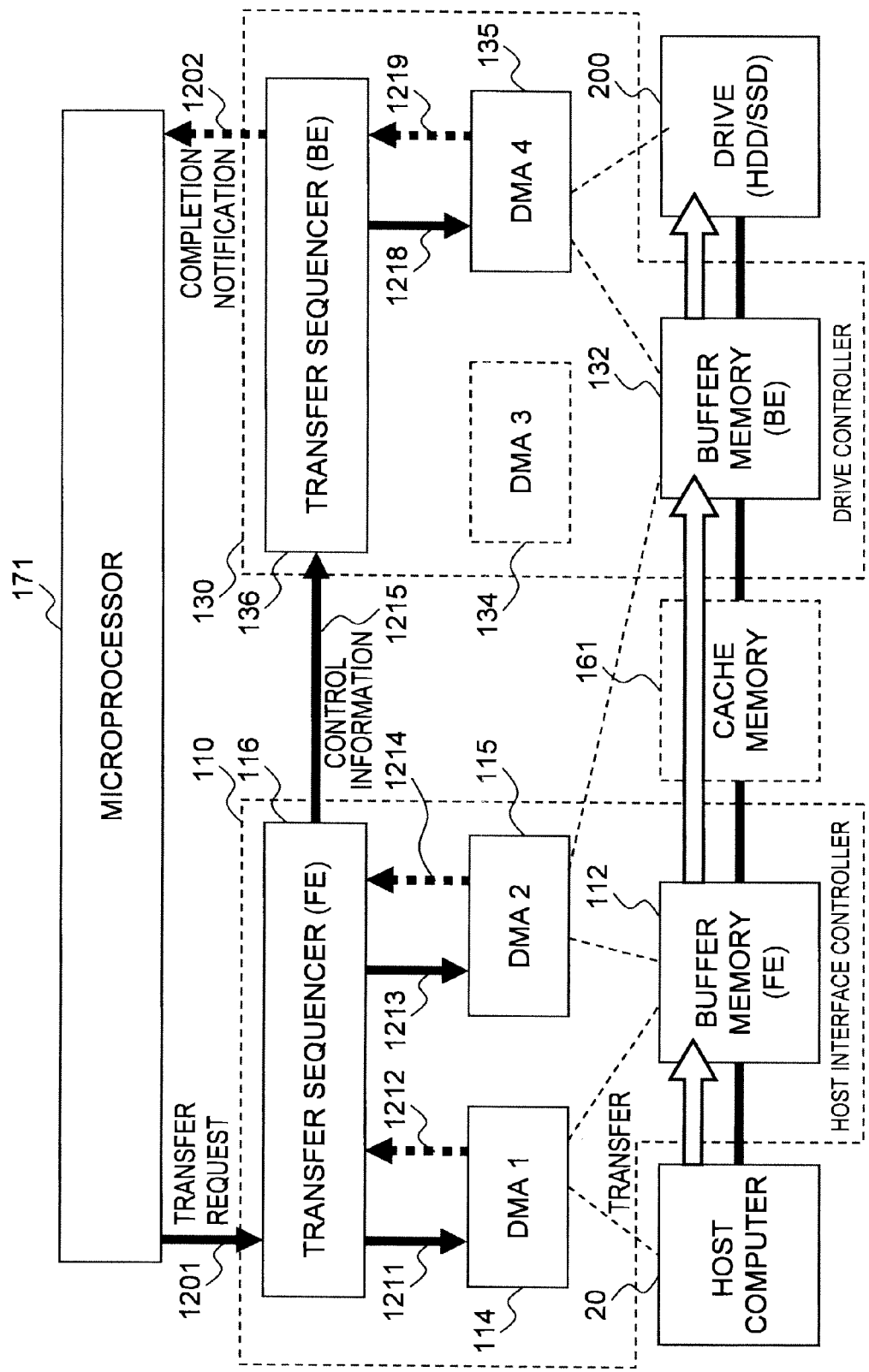
FIG. 12 is a diagram showing a cache-less transfer of write data of a disk array apparatus of a second embodiment of the present invention.

FIG. 12 is a diagram of the transfer of data of a disk array apparatus of the second embodiment showing an example of the cache-less transfer of write data from the host computer 20 to the disk unit 200.

The microprocessor 171 transmits a data transfer request 1201 to the transfer sequencer (FE) 116 of the host interface controller 110, instructs data transfers to the DMA controllers 114, 115 and instructs a data transfer to the DMA controller 135 via the transfer sequencer (BE) 136 of the drive controller 130.

First, the microcomputer 171 assembles a transfer sequence used to transfer data transmitted from the host computer 20 to the buffer memory in the storage device of the disk unit 200 and transmits the transfer request 1201 including this sequence to the transfer sequencer (FE) 116.

Specifically, the microcomputer 171 transmits the transfer request 1201 to the transfer sequencer (FE) 116 after writing DMA control parameters (address of a transfer source, address of a transfer destination, length of data to be transferred, transfer path, protection code, end status storage address) for the transfer of the data transmitted from the host computer 20 to the storage device of the disk unit 200 via the respective memories in a predetermined address of the buffer memory (FE) 112 of the host interface controller 110. The transfer request 1201 to the transfer sequencer (FE) 116 includes the identifier of the DMA controller which is to be requested the data transfer, the data transfer request to each of the DMA controllers and an identifier of a requestor (microprocessor 171) as successive DMA start-up parameters.

When receiving the transfer request 1201, the transfer sequencer (FE) 116 extracts the identifier of the DMA controller which is to be requested the data transfer and information of the data transfer request to each of the DAM controllers, which includes the address where the DMA control parameters are stored and an identifier of a requestor (microprocessor 171), from the received transfer request 1201, and generates transfer requests 1211, 1213 to be transmitted to the DMA controllers 114, 115 in accordance with the obtained control parameters. The transfer requests 1211, 1213 to the DMA controllers 114, 115 include the address where the DMA control parameters are stored and an identifier of a requestor (transfer sequencer (FE) 116).

Then, the transfer sequencer (FE) 116 transmits the transfer request 1211 to transfer the data transmitted from the host computer 20 (actually, data stored in the unillustrated reception buffer) to the buffer memory (FE) 112 of the host interface controller 110 to the DMA controller 114.

When receiving the data transfer request 1211 from the transfer sequencer (FE) 116, the DMA controller 114 transfers the data transmitted from the host computer 20 and stored in the reception buffer to the buffer memory (FE) 112 of the host interface controller 110. Specifically, when receiving the transfer request 1211, the DMA controller 114 obtains the control parameters (address of the transfer source, address of the transfer destination, length of data to be transferred, transfer path, protection code, end status storage address) from the address designated by the transfer request 1211 and transfers the data between the memories in accordance with the obtained control parameters.

When the data transfer to the buffer memory (FE) 112 is completed, the DMA controller 114 transmits a completion notification 1212 to the transfer sequencer (FE) 116. Specifically, the DMA controller 114 notifies the completion of the data transfer to the requestor identified by the identifier designated by the transfer request 1211.

When receiving the completion notification 1212 of the data transfer from the DMA controller 114, the transfer sequencer (FE) 116 transmits the transfer request 1213 to transfer the data stored in the buffer memory (FE) 112 to the buffer memory (BE) 132 to the DMA controller 115 that controls the next data transfer.

When receiving the data transfer request 1213 from the transfer sequencer (FE) 116, the DMA controller 115 transfers the data stored in the buffer memory (FE) 112 to the buffer. memory (BE) 132. When the data transfer from the buffer memory (FE) 112 to the buffer memory (BE) 132 is completed, the DMA controller 115 transmits a completion notification 1214 to the transfer sequencer (FE) 116.

When receiving the completion notification 1214 of the data transfer from the DMA controller 115, the transfer sequencer (FE) 116 transmits control information 1215 for controlling the subsequent transfers to the transfer sequencer (BE) 136 of the drive controller 130 that controls the next control.

When receiving the control information 1215 from the transfer sequencer (FE) 116, the transfer sequencer (BE) 136 transmits a transfer request 1218 to transfer the data stored in the buffer memory (BE) 132 to the disk unit 200 to the DMA controller 135 that controls the next data transfer.

When receiving the data transfer request 1218 from the transfer sequencer (BE) 136, the DMA controller 135 transfers the data stored in the buffer memory (BE) 132 to the disk unit 200 (e.g. buffer memory in the storage device). When the data transfer from the buffer memory (BE) 132 is completed, the DMA controller 135 transmits a completion notification 1219 to the transfer sequencer (BE) 136.

When receiving the completion notification 1219 of the data transfer from the DMA controller 135, the transfer sequencer (BE) 136 transmits a completion notification 1202 of the data transfer to the disk unit 200 to the microprocessor 171. Actually, the transfer sequencer (BE) 136 writes an end status in the address designated by the transfer request 1201 and the microprocessor 171 notifies the completion of the data transfer by checking data in this address at a predetermined timing.

Figure 13:
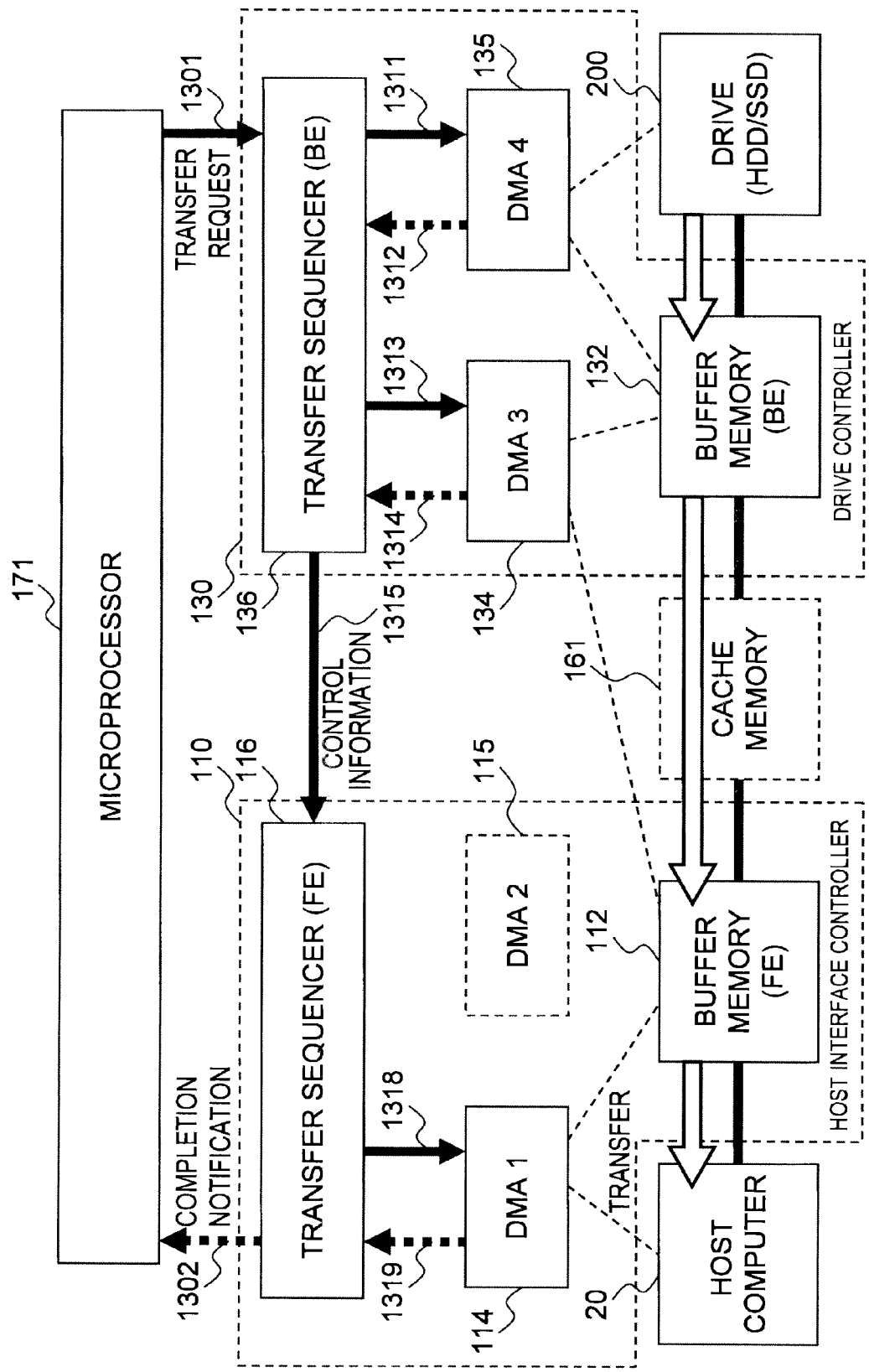
FIG. 13 is a diagram showing a cache-less transfer of read data of the disk array apparatus of the second embodiment of the present invention.

FIG. 13 is a diagram of the transfer of data of the disk array apparatus of the second embodiment showing an example of the cache-less transfer of read data from the disk unit 200 to the host computer 20.

The microprocessor 171 transmits a data transfer request 1301 to the transfer sequencer (BE) 136 of the drive controller 130, instructs data transfers to the DMA controllers 134, 135 and instructs a data transfer to the DMA controller 114 via the transfer sequencer (FE) 116 of the host interface controller 110.

First, the microcomputer 171 assembles a transfer sequence used to transfer data stored in the buffer memory in the storage device of the disk unit 200 to the host computer 20 and transmits the transfer request 1301 including this sequence to the transfer sequencer (BE) 136.

Specifically, the microprocessor 171 transmits the transfer request 1301 to the transfer sequencer (BE) 136 after writing DMA control parameters (address of a transfer source, address of a transfer destination, length of data to be transferred, transfer path, protection code, end status storage address) for the transfer of data stored in the disk unit 200 (e.g. buffer memory in the storage device) to the storage device of the host computer 20 via the respective memories in a predetermined address of the buffer memory (BE) 132 of the drive controller 130. The transfer request 1301 to the transfer sequencer (BE) 136 includes the identifier of the DMA controller which is to be requested the data transfer, the data transfer request to each of the DMA controllers and an identifier of a requestor (microprocessor 171) as successive DMA start-up parameters similar to the transfer request 1201 described above.

When receiving the data transfer request 1301, the transfer sequencer (BE) 136 extracts the identifier of the DMA controller which is to be requested the data transfer and information of the data transfer request to each of the DAM controllers, which includes the address where the DMA control parameters are stored and an identifier of a requestor (microprocessor 171), from the received transfer request 1301, and generates transfer requests 1311, 1313 to be transmitted to the DMA controllers 134, 135 in accordance with the obtained control parameters. The transfer requests 1311, 1313 to the DMA controllers 134, 135 include the address where the DMA control parameters are stored and an identifier of a requestor (transfer sequencer (BE) 136).

Then, the transfer sequencer (BE) 136 transmits the transfer request 1311 to transfer the data stored in the disk unit 200 (e.g. buffer memory in the storage device) to the buffer memory (BE) 132 of the drive controller 130 to the DMA controller 135.

When receiving the transfer request 1311 from the transfer sequencer (BE) 136, the DMA controller 135 transfers the data from the disk unit 200 to the buffer memory (BE) 132. Specifically, when obtaining the transfer request 1311, the DMA controller 135 obtains the control parameters (address of the transfer source, address of the transfer destination, length of data to be transferred, transfer path, protection code, end status storage address) from the address designated by the transfer request 1311 and transfers the data between the memories in accordance with the obtained control parameters.

When the data transfer to the buffer memory (BE) 132 is completed, the DMA controller 135 transmits a completion notification 1312 to the transfer sequencer (BE) 136. Specifically, the DMA controller 135 notifies the completion of the data transfer to the requestor identified by the identifier designated by the transfer request 1311.

When receiving the completion notification 1312 of the data transfer from the DMA controller 135, the transfer sequencer (BE) 136 transmits the transfer request 1313 to transfer the data stored in the buffer memory (BE) 132 to the buffer memory (FE) 112 to the DMA controller 134 that controls the next data transfer.

When receiving the data transfer request 1313 from the transfer sequencer (BE) 136, the DMA controller 134 transfers the data stored in the buffer memory (BE) 132 to the buffer memory (FE) 112. When the data transfer from the buffer memory (BE) 132 to the buffer memory (FE) 112 is completed, the DMA controller 134 transmits a completion notification 1314 to the transfer sequencer (BE) 136.

When receiving the completion notification 1314 of the data transfer from the DMA controller 134, the transfer sequencer (BE) 136 transmits control information 1315 for controlling the subsequent transfers to the transfer sequencer (FE) 116 of the host interface controller 110 that controls the next data transfer.

When receiving the control information 1315 from the transfer sequencer (BE)136, the transfer sequencer (FE) 116 transmits a transfer request 1318 to transfer the data stored in the buffer memory (FE) 112 to the host computer 20 to the DMA controller 114 that controls the next data transfer.

When receiving the data transfer request 1318 from the transfer sequencer (FE) 116, the DMA controller 114 transfers the data stored in the buffer memory (FE) 112 to the unillustrated transmission buffer for transmission to the host computer 20. Thereafter, when the data transfer from the buffer memory (FE) 112 is completed, the DMA controller 114 transmits a completion notification 1319 of the data transfer to the transfer sequencer (FE) 116.

When receiving the completion notification 1319 of the data transfer from the DMA controller 114, the transfer sequencer (FE) 116 transmits, to the microprocessor 171, a completion notification 1302 of the data transfer to the host computer 20. Actually, the transfer sequencer (FE) 116 writes an end status in the address designated by the transfer request 1301 and the microprocessor 171 notifies the completion of the data transfer by checking data in this address at a predetermined timing.

Figure 14:
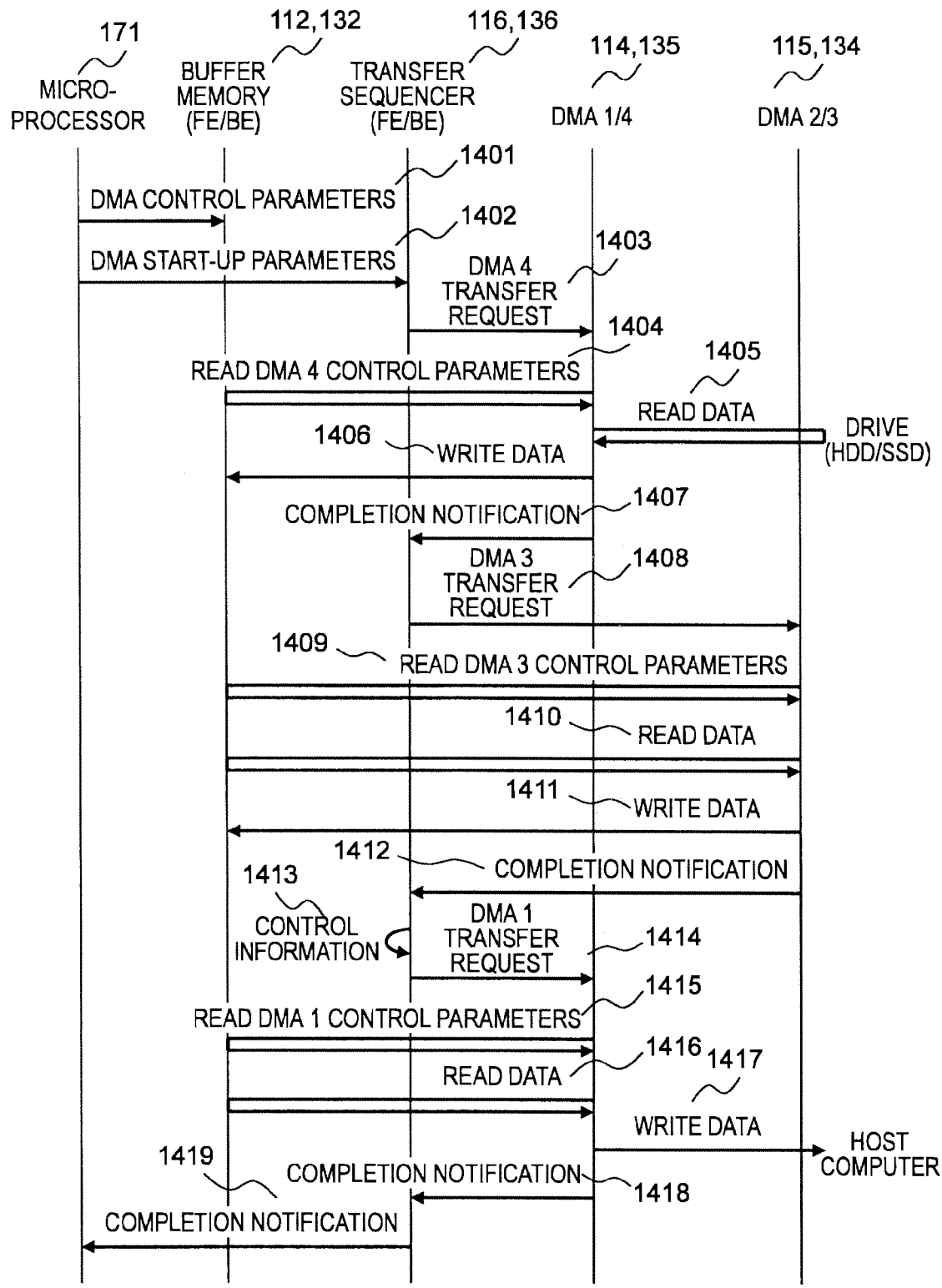
FIG. 14 is a sequence diagram showing a read data cache-less transfer control performed by DMA controllers of the second embodiment of the present invention.

FIG. 14 is a sequence diagram of controls of the DMA controllers by the transfer sequencers of the disk array apparatus of the second embodiment showing the procedure of the cache-less transfer of read data from the disk unit 200 to the host computer 20 shown in FIG. 13.

First, the microprocessor 171 generates the DMA control parameters for the data transfer requested from the host computer 20 and writes the generated DMA control parameters in the predetermined address of the buffer memory (FE) 112 of the host interface controller 110 (1401). The DMA control parameters include the address of a transfer source, the address of a transfer destination, the length of data to be transferred, a transfer path, a protection code and an end status storage address.

Thereafter, the microprocessor 171 transmits the DMA start-up parameters as the transfer request 1301 to the transfer sequencer (BE) 136 (1402). The DMA start-up parameters include an identifier of the DMA controller which is to be requested the data transfer, the data transfer request to each of the DMA controllers and an identifier of a requestor (microprocessor 171).

When receiving the transfer request 1301 (DMA start-up parameters), the transfer sequencer (BE) 136 extracts the identifier of the DMA controller which is to be requested the data transfer and information of the data transfer request to each of the DAM controllers, which includes the address where the DMA control parameters are stored and an identifier of a requestor (microprocessor 171), from the received DMA start-up parameters, and generates a transfer request 1311 to be transmitted to the DMA controller in accordance with the obtained control parameters. The transfer request to the DMA controller includes the address where the DMA control parameters are stored and an identifier of a requestor (transfer sequencer (BE) 136). Thereafter, the transfer sequencer (BE) 136 transmits the generated transfer request 1311 to the DMA controller 135 (1403).

The DMA controller 135 obtains the control parameters (address of the transfer source, address of the transfer destination, length of data to be transferred, transfer path, protection code, end status storage address) from the address designated by the transfer request 1311 from the transfer sequencer (BE) 136 (1404).

Then, the DMA controller 135 reads the data stored in the buffer memory of the disk unit 200 in accordance with the obtained control parameters (1405) and writes it in the buffer memory (BE) 132 of the drive controller 130 (1406).

Thereafter, the DMA controller 135 transmits the completion notification 1312 to the requestor (transfer sequencer (BE) 136) identified by the identifier designated by the transfer request 1311 (1407).

When receiving the completion notification 1312 of the data transfer from the DMA controller 135, the transfer sequencer (BE) 136 transmits the transfer request 1313 to transfer the data stored in the buffer memory (BE) 132 to the buffer memory (FE) 112 of the host interface controller 110 to the DMA controller 134 that controls the next data transfer (1408).

The DMA controller 134 obtains the control parameters (address of the transfer source, address of the transfer destination, length of data to be transferred, transfer path, protection code, end status storage address) from the address designated by the transfer request 1313 from the transfer sequencer (BE) 136 (1409).

Then, the DMA controller 134 reads the data stored in the buffer memory (BE) 132 in accordance with the obtained control parameters (1410) and writes it in the buffer memory (FE) 112 (1411).

Thereafter, the DMA controller 134 transmits the completion notification 1314 to the requestor (transfer sequencer (BE) 136) identified by the identifier designated by the transfer request 1313 (1412).

When receiving the completion notification 1314 of the data transfer from the DMA controller 134, the transfer sequencer (BE) 136 transmits the control information 1315 for controlling the subsequent transfers to the transfer sequencer (FE) 116 of the host interface controller 110 that controls the next data transfer (1413).

When receiving the control information 1315 from the transfer sequencer (BE) 136, the transfer sequencer (FE) 116 transmits the transfer request 1318 to transfer the data stored in the buffer memory (FE) 112 to the host computer 20 to the DMA controller 114 that controls the next data transfer (1414).

The DMA controller 114 obtains the control parameters (address of the transfer source, address of the transfer destination, length of data to be transferred, transfer path, protection code, end status storage address) from the address designated by the transfer request 1318 from the transfer sequencer (FE) 116 (1415).

Then, the DMA controller 114 reads the data stored in the buffer memory (FE) 112 in accordance with the obtained control parameters (1416) and writes it in the host computer 20 (e.g. transmission buffer in the host interface controller 110) (1417).

Thereafter, the DMA controller 114 transmits the completion notification 1319 to the requestor (transfer sequencer (FE) 116) identified by the identifier designated by the transfer request 1318 (1418).

When receiving the completion notification 1319 of the data transfer from the DMA controller 114, the transfer sequencer (FE) 116 notifies the completion of the data transfer to the microprocessor 171 by writing an end status of the data transfer from the disk unit 200 in the address designated by the transfer request 1301 (1419).

Whether the data transfer skipping the cache memory described above is to be performed is judged by the microprocessor 171. For example, whether to perform the cache-less transfer can be determined depending on the size of data to be transferred. This is because there is a low possibility of a cache hit when the data size is large.

Specifically, the microprocessor 171 performs a data transfer via the cache memory (first embodiment) when the size of data to be transferred is smaller than a predetermined value while performing a cache-less transfer (second embodiment) when the size of data to be transferred is larger than the predetermined value.

Further, whether to perform a cache-less transfer can be determined depending on the type of the storage device to and from which data is input and output. This is because, when the storage device to and from which data is input and output is a non-volatile semiconductor storage device (SSD), there is little necessity to improve response performance to the host computer 20 by temporarily storing data in the cache memory since data can be input to and output from the storage device at a high speed.

Specifically, the microprocessor 171 performs a data transfer via the cache memory (first embodiment) when the storage device to and from which data is input and output is a magnetic disk drive (HDD) while performing a cache-less transfer (second embodiment) when the storage device to and from which data is input and output is a non-volatile semiconductor storage device (SSD).

Further, whether to perform a cache-less transfer can be determined depending on a connection relationship of the disk array apparatus. This is because, in the case of inputting and outputting data to and from an externally connected disk array apparatus, there is little necessity to temporarily store data to be input or output in both a cache memory of a disk array apparatus connected to the host computer and a cache memory of a disk array apparatus including a storage device.

Specifically, as described in a third embodiment, the microprocessor 171 performs a data transfer via a cache memory (first embodiment) when the storage device to and from which data is input and output is a storage device of the disk array apparatus the microprocessor 171 belongs to while performing a cache-less transfer (second embodiment) when the storage device to and from which data is input and output is a storage device of an externally connected disk array apparatus.

Further, whether to perform a data transfer skipping a part of memories can be determined depending on data to be input and output. This is because there is little necessity to transfer data of a pattern frequently input and output (e.g. data, all the bits of which are "0" or "1") in the disk array apparatus.

Specifically, as described in a fourth embodiment, if data to be written is data of a predetermined pattern, the transfer sequencers 116, 136 transfer the data of the predetermined pattern stored in the cache memory 161 to the disk unit 200 without transferring the data from the host interface controller 110 to the cache memory 161. On the other hand, unless data to be written is data of a predetermined pattern, the transfer sequencers 116, 136 perform a data transfer via the cache memory (first embodiment).

Figure 15:
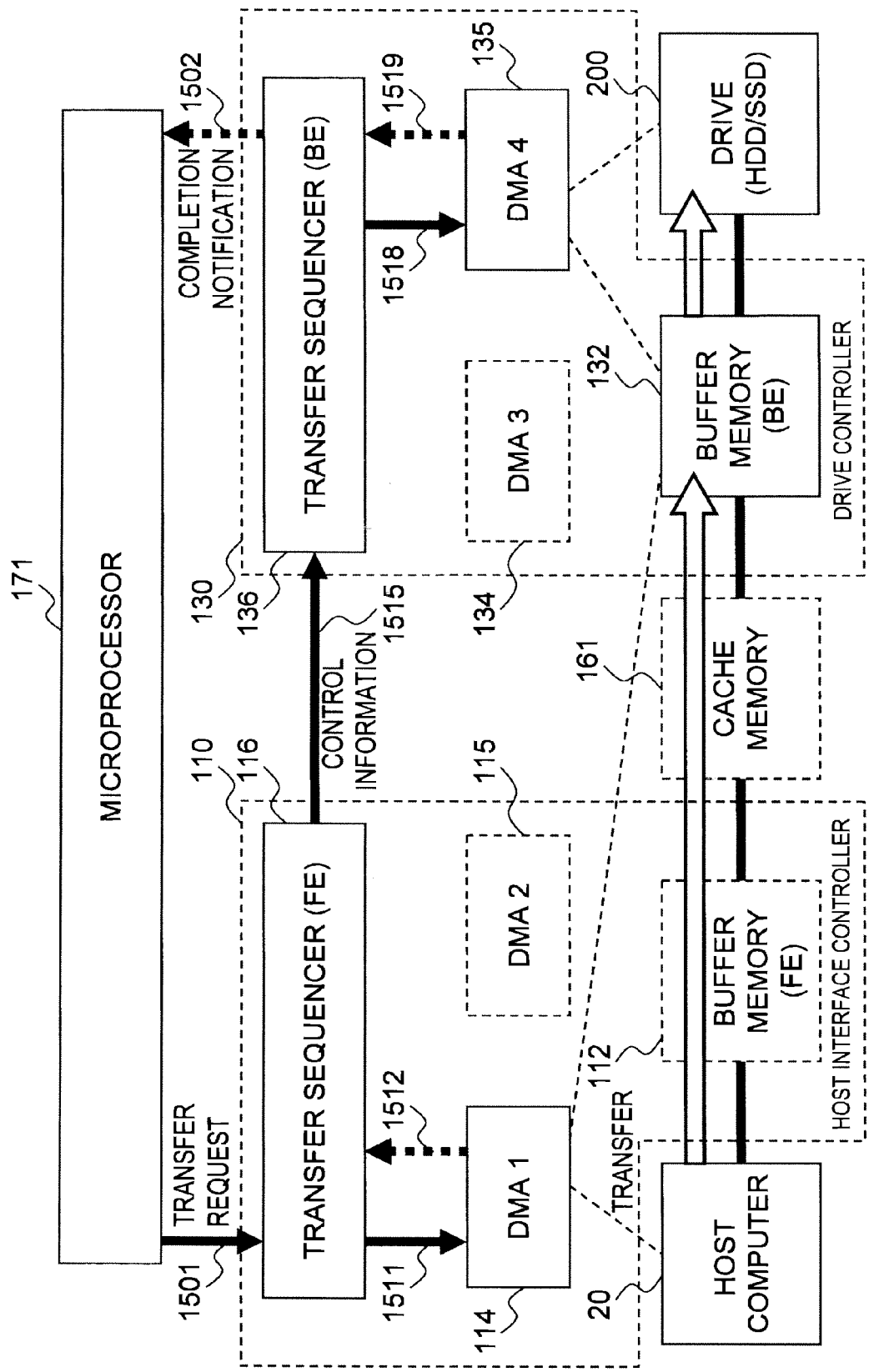
FIG. 15 is a diagram showing another cache-less transfer of write data of the disk array apparatus of the second embodiment of the present invention.
Figure 16:
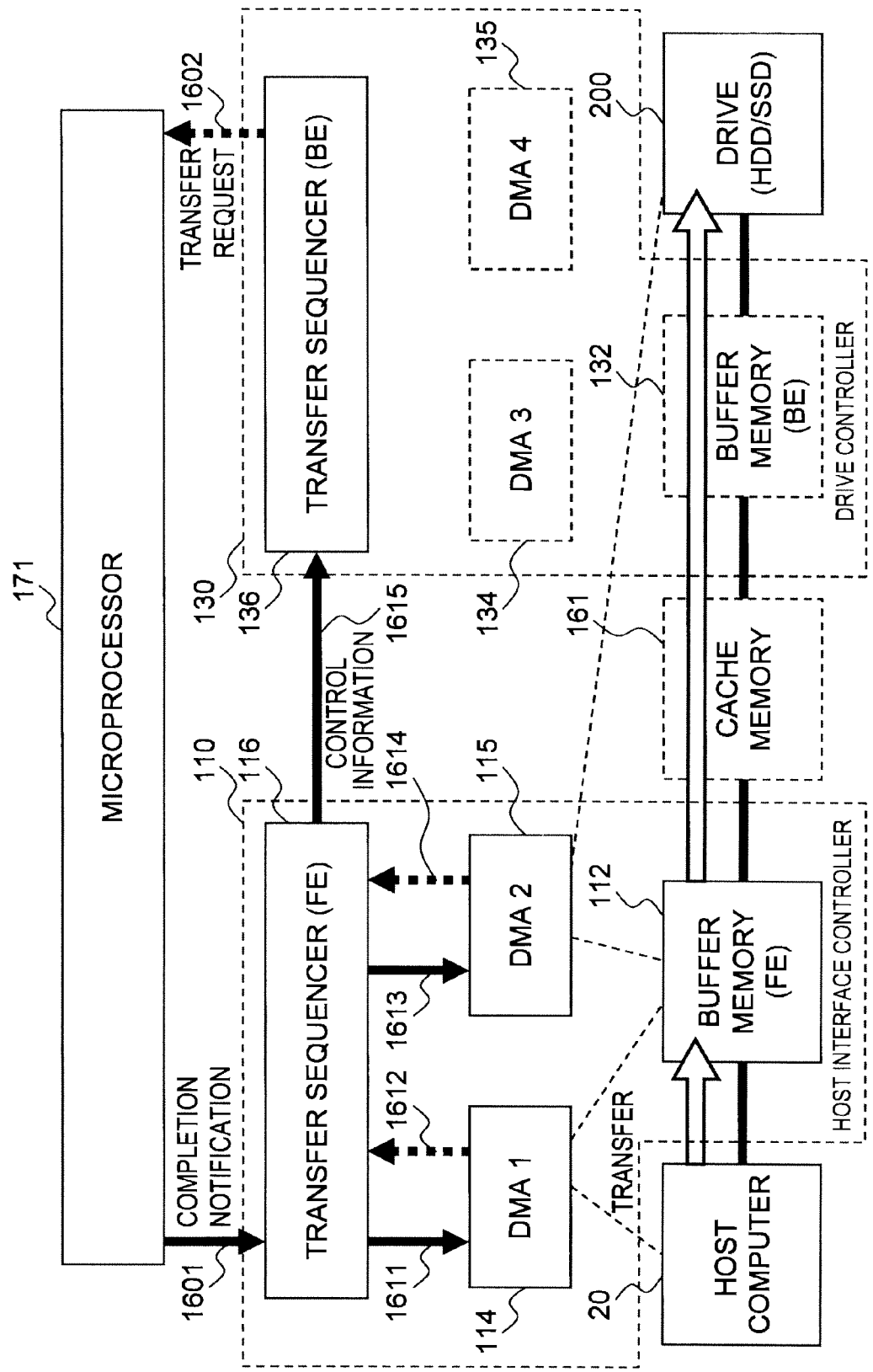
FIG. 16 is a diagram showing another cache-less transfer of write data of the disk array apparatus of the second embodiment of the present invention.

Next, an example of another cache-less transfer is described using FIGS. 15 and 16.

FIG. 15 is a diagram of the transfer of data of the disk array apparatus of the second embodiment showing another example of the transfer of write data from the host computer 20 to the disk unit 200. In the cache-less transfer shown in FIG. 15, data is transferred while the buffer memory (FE) 112 of the host interface controller 110 and the cache memory 161 are skipped.

The microprocessor 171 transmits a data transfer request 1501 to the transfer sequencer (FE) 116 of the host interface controller 110, instructs data transfers to the DMA controllers 114, 115 and instructs a data transfer to the DMA controller 135 via the transfer sequencer (BE) 136 of the drive controller 130.

First, the microcomputer 171 assembles a transfer sequence used to transfer data transmitted from the host computer 20 to the buffer memory in the storage device of the disk unit 200 and transmits the transfer request 1501 including this sequence to the transfer sequencer (FE) 116.

Specifically, the microcomputer 171 transmits the transfer request 1501 to the transfer sequencer (FE) 116 after writing DMA control parameters (address of a transfer source, address of a transfer destination, length of data to be transferred, transfer path, protection code, end status storage address) for the transfer of the data transmitted from the host computer 20 to the storage device of the disk unit 200 via the respective memories in a predetermined address of the buffer memory (FE) 112 of the host interface controller 110. The transfer request 1501 to the transfer sequencer (FE) 116 includes an identifier of the DMA controller which is to be requested the data transfer, the data transfer request to each of the DMA controllers and an identifier of a requestor (microprocessor 171) as successive DMA start-up parameters.

When receiving the transfer request 1501, the transfer sequencer (FE) 116 extracts the identifier of the DMA controller which is to be requested the data transfer and information of the data transfer request to each of the DAM controllers, which includes the address where the DMA control parameters are stored and an identifier of a requestor (microprocessor 171), from the received transfer request 1501, and generates transfer requests 1511 to be transmitted to the DMA controllers 114 in accordance with the obtained control parameters. The transfer requests 1511 to the DMA controllers 114 include the address where the DMA control parameters are stored and an identifier of a requestor (transfer sequencer (FE) 116).

Then, the transfer sequencer (FE) 116 transmits the transfer request 1511 to transfer the data transmitted from the host computer 20 (actually, data stored in the unillustrated reception buffer) to the buffer memory (BE) 132 of the drive controller 130 to the DMA controller 114.

When receiving the data transfer request 1501 from the transfer sequencer (FE) 116, the DMA controller 114 transfers the data transmitted from the host computer 20 and stored in the reception buffer to the buffer memory (BE) 132. Specifically, when receiving the transfer request 1511, the DMA controller 114 obtains the control parameters (address of the transfer source, address of the transfer destination, length of data to be transferred, transfer path, protection code, end status storage address) from the address designated by the transfer request 1511 and transfers the data between the memories in accordance with the obtained control parameters.

When the data transfer to the buffer memory (BE) 132 is completed, the DMA controller 114 transmits a completion notification 1512 to the transfer sequencer (FE) 116. Specifically, the DMA controller 114 notifies the completion of the data transfer to the requestor identified by the identifier designated by the transfer request 1511.

When receiving the completion notification 1512 of the data transfer from the DMA controller 114, the transfer sequencer (FE) 116 transmits control information 1515 for controlling the subsequent transfers to the transfer sequencer (BE) 136 of the drive controller 130 that controls the next transfer.

When receiving the control information 1515 from the transfer sequencer (FE) 116, the transfer sequencer (BE) 136 transmits a transfer request 1518 to transfer the data stored in the buffer memory (BE) 132 to the disk unit 200 to the DMA controller 135 that controls the next transfer.

When receiving the data transfer request 1518 from the transfer sequencer (BE) 136, the DMA controller 135 transfers the data stored in the buffer memory (BE) 132 to the disk unit 200 (e.g. buffer memory in the storage device). When the data transfer from the buffer memory (BE) 132 is completed, the DMA controller 135 transmits a completion notification 1519 of the data transfer to the transfer sequencer (BE) 136.

When receiving the completion notification 1519 of the data transfer from the DMA controller 135, the transfer sequencer (BE) 136 transmits a completion notification 1502 of the data transfer to the disk unit 200 to the microprocessor 171. Actually, the transfer sequencer (BE) 136 writes an end status in the address designated by the transfer request 1501 and the microprocessor 171 notifies the completion of the data transfer by checking data in this address at a predetermined timing.

FIG. 16 is a diagram of the transfer of data of the disk array apparatus of the second embodiment showing another example of the transfer of write data from the host computer 20 to the disk unit 200. In the cache-less transfer shown in FIG. 16, data is transferred while the cache memory 161 and the buffer memory (BE) 132 of the drive controller 130 are skipped.

The microprocessor 171 transmits a data transfer request 1601 to the transfer sequencer (FE) 116 of the host interface controller 110 and instructs data transfers to the DMA controllers 114, 115.

First, the microprocessor 171 assembles a transfer sequence used to transfer data transmitted from the host computer 20 to the buffer memory in the storage device of the disk unit 200 and transmits the transfer request 1601 including this sequence to the transfer sequencer (FE) 116 of the host interface controller.

Specifically, the microprocessor 171 transmits the transfer request 1601 to the transfer sequencer (FE) 116 after writing DMA control parameters (address of a transfer source, address of a transfer destination, length of data to be transferred, transfer path, protection code, end status storage address) for the transfer of the data transmitted from the host computer 20 to the storage device of the disk unit 200 via the respective memories in a predetermined address of the buffer memory (FE) 112 of the host interface controller 110. The transfer request 1601 to the transfer sequencer (FE) 116 includes an identifier of the DMA controller which is to be requested the data transfer, the data transfer request to each of the DMA controllers and an identifier of a requestor (microprocessor 171) as successive DMA start-up parameters.

When receiving the transfer request 1601, the transfer sequencer (FE) 116 extracts the identifier of the DMA controller which is to be requested the data transfer and information of the data transfer request to each of the DAM controllers, which includes the address where the DMA control parameters are stored and an identifier of a requestor (microprocessor 171), from the received transfer request 1601, and generates transfer requests 1611, 1613 to be transmitted to the DMA controllers 114, 115 in accordance with the obtained control parameters. The transfer requests 1611, 1613 to the DMA controllers 114, 115 include the address where the DMA control parameters are stored and an identifier of a requestor (transfer sequencer (FE) 116).

Then, the transfer sequencer (FE) 116 transmits the transfer request 1611 to transfer the data transmitted from the host computer 20 (actually, data stored in the unillustrated reception buffer) to the buffer memory (FE) 112 of the host interface controller 110 to the DMA controller 114.

When receiving the data transfer request 1611 from the transfer sequencer (FE) 116, the DMA controller 114 transfers the data transmitted from the host computer 20 and stored in the reception buffer to the buffer memory (FE) 112 of the host interface controller 110. Specifically, when receiving the transfer request 1611, the DMA controller 114 obtains the control parameters (address of the transfer source, address of the transfer destination, length of data to be transferred, transfer path, protection code, end status storage address) from the address designated by the transfer request 1611 and transfers the data between the memories in accordance with the obtained control parameters.

When the data transfer to the buffer memory (FE) 112 is completed, the DMA controller 114 transmits a completion notification 1612 to the transfer sequencer (FE) 116. Specifically, the DMA controller 114 notifies the completion of the data transfer to the requestor identified by the identifier designated by the transfer request 1611.

When receiving the completion notification 1612 of the data transfer from the DMA controller 114, the transfer sequencer (FE) 116 transmits the transfer request 1613 to transfer the data stored in the buffer memory (FE) 112 to the disk unit 200 to the DMA controller 115 that controls the next transfer.

When receiving the data transfer request 1613 from the transfer sequencer (FE) 116, the DMA controller 115 transfers the data stored in the buffer memory (FE) 112 to the disk unit 200 (e.g. buffer memory in the storage device). When the data transfer from the buffer memory (FE) 112 is completed, the DMA controller 115 transmits a completion notification 1614 to the transfer sequencer (FE) 116.

When receiving the completion notification 1614 of the data transfer from the DMA controller 115, the transfer sequencer (FE) 116 transmits control information 1615 to the transfer sequencer (BE) 136 of the drive controller 130. This control information includes information indicating that all the transfers requested by the transfer request 1601 have been completed, but includes no information for controlling the subsequent transfers.

When receiving the control information 1615 from the transfer sequencer (FE) 116, the transfer sequencer (BE) 136 confirms that the control information 1615 includes no requests to the DMA controllers 134, 135 under the transfer sequencer (BE) 136 and transmits a completion notification 1602 of the data transfer to the disk unit 200 to the microprocessor 171. Actually, the transfer sequencer (BE) 136 writes an end status in the address designated by the transfer request 1601 and the microprocessor 171 notifies the completion of the data transfer by checking data in this address at a predetermined timing.

Note that although the transfer sequencer (BE) 136 of the drive controller 130 transmits the completion notification 1602 to the microprocessor 171 in the cache-less transfer shown in FIG. 16, the transfer sequencer (FE) 116 of the host interface controller 110 may transmit a completion notification to the microprocessor 171.

Further, in the cache-less transfers shown in FIGS. 15 and 16, data may be transferred while the buffer memory (FE) 112 of the host interface controller 110, the cache memory 161 and the buffer memory (BE) 132 of the drive controller 130 are skipped.

Note that the buffer memories and the cache memory in which data being transferred is temporarily stored are necessary when a transfer format differs in paths before and after these memories or when a transfer rate differs in paths before and after these memories. Thus, data can be transferred while the buffer memories and the cache memory are skipped if the transfer format and the transfer rate are equal in the paths before and after them.

As described above, since data is transferred between the memories using the transfer sequencers 116, 136 according to the second embodiment of the present invention, the microprocessor 171 only transmits one transfer request to the transfer sequencer 116 or 136 and a load on the microprocessor 171 can be reduced also in the cache-less transfer without passing through the cache memory 161. Further, since the microprocessor 171 only receives one transfer completion notification from the transfer sequencer 116 or 136, the switching overhead of the process for processing the completion notification becomes unnecessary and the load on the microprocessor 171 can be reduced also in the: cache-less transfer without passing through the cache memory 161.

<Third Embodiment>

Next, a third embodiment of the present invention is described. In the third embodiment, in transferring data between disk array apparatuses connected to each other, a cache-less transfer is performed to transfer the data while a cache memory 161 of a disk array apparatus as a data transfer source is skipped.

Figure 17A:
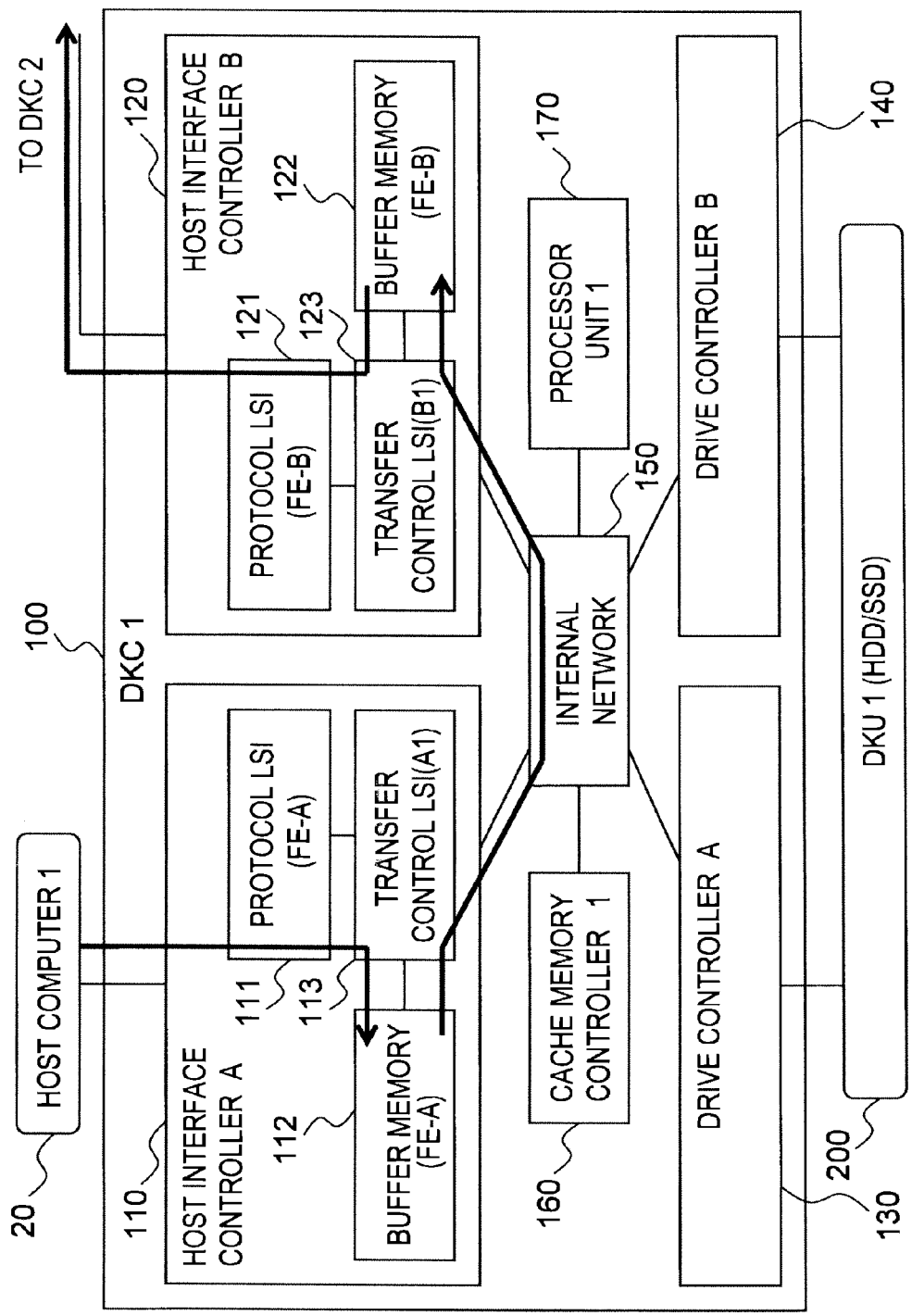
FIG. 17A is a block diagrams showing an example of configuration at an externally connecting of a disk array apparatus of a third embodiment of the present invention.
Figure 17B:
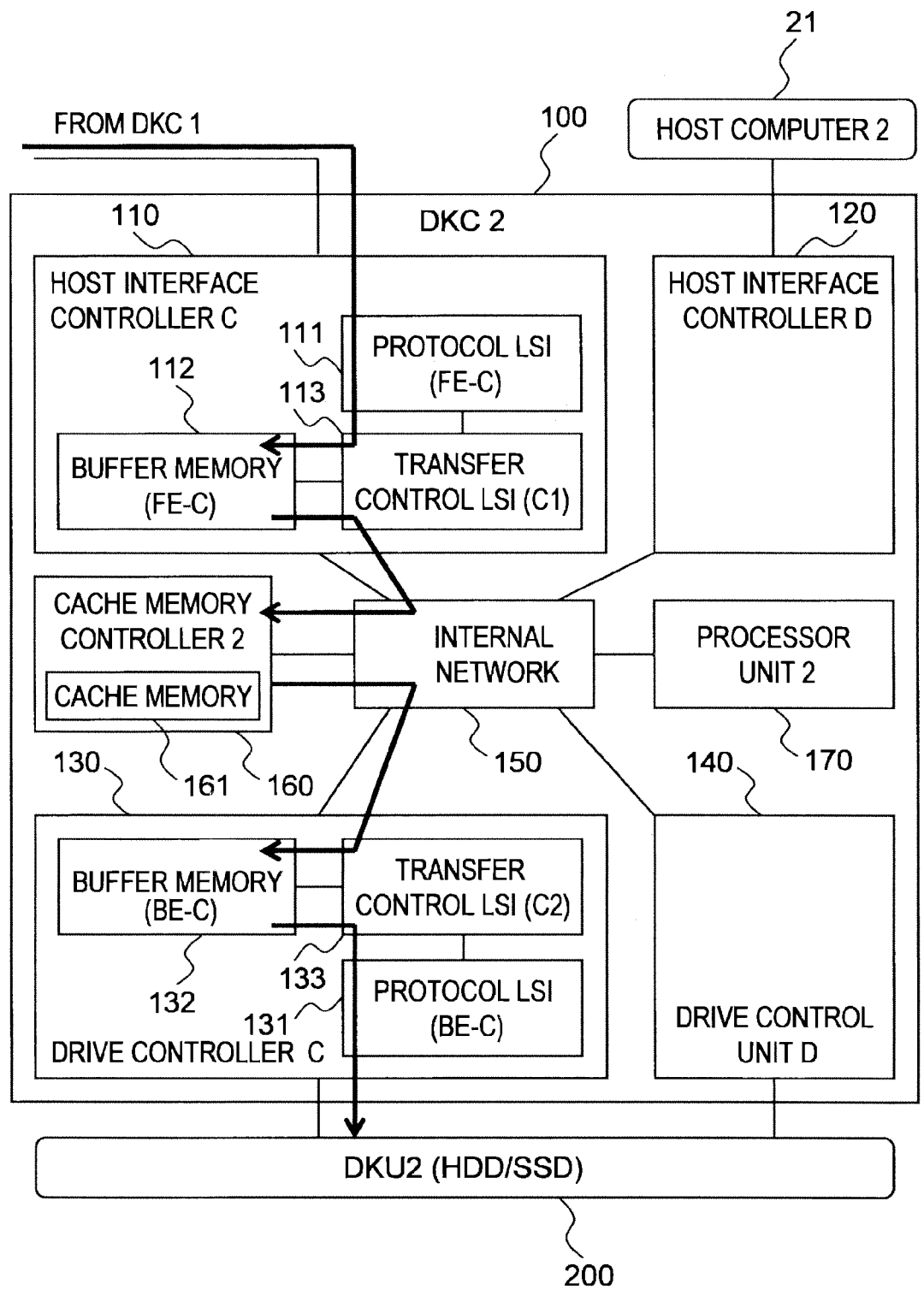
FIG. 17B is a block diagrams showing an example of configuration at the externally connecting of the disk array apparatus of the third embodiment of the present invention.

FIGS. 17A, 17B are block diagrams showing an example of configurations at the time of externally connecting disk array apparatuses of the third embodiment of the present invention, wherein FIG. 17A shows a configuration of the disk array apparatus as a data transfer source and FIG. 17B shows a configuration of the disk array apparatus as a data transfer destination.

The disk array apparatus as the data transfer source and the disk array apparatus as the data transfer destination are connected by disk controllers 100 (DKC1, DKC2).

A host computer 1(20) is connected to a host interface controller A(110) of the disk controller 1(100) of the disk array apparatus as the data transfer source.

A host interface controller B(120) of the disk controller 1(100) of the disk array apparatus as the data transfer source is connected to a host interface controller C(110) of the disk controller 2(100) of the disk array apparatus as the data transfer destination.

Next, the flow of data in writing data from the host computer 1(20) connected to the disk controller 1(100) to a disk unit DKU2 (200) of the disk array apparatus as the data transfer destination is described.

The data transmitted from the host computer 1(20) is converted from a protocol used in communication with the host computer 1(20) into a communication protocol in the disk controller 100 by a protocol LSI(FE-A) 111 and stored in a buffer memory (FE-1A) 112.

Thereafter, a transfer control LSI(A1) 113 transfers the data stored in the buffer memory (FE-A) 112 to a buffer memory (FE-B) 122 of a host interface controller B(120) via an internal network 150. A protocol LSI (FE-B) 121 transfers the data stored in the buffer memory (FE-B) 122 to a reception buffer (not shown) of a protocol LSI (FE-C) 111 of the disk controller 2(100) of the disk array apparatus as the data transfer destination. The data transferred to the disk controller 2(100) of the disk array apparatus as the data transfer destination is transferred in the form of a data write request to the disk array apparatus as the data transfer destination.

The protocol LSI (FE-C) 111 stores the data stored in the reception buffer in a buffer memory (FE-C) 112 of the host interface controller C(110). A transfer control LSI (C-1) 113 transfers the data stored in the buffer memory (FE-C) 112 to a cache memory controller 2(160) of a drive controller C(130) via the internal network 150.

The transfer control LSI (C-2) 133 transfers the data stored in the cache memory controller 2(160) to a buffer memory (BE-C) 132 of the drive controller C(130) via the internal network 150. A protocol LSI (BE-C) 131 transfers the data stored in the buffer memory (BE-C) 132 to the disk unit DKU2 (200).

Note that although the disk array apparatus as the data transfer source shown in FIG. 17A includes the drive controllers 130, 140 and the disk unit (DKU) 200, it may not include the disk unit (storage device) 200. That is, the disk array apparatus as the data transfer source is a so-called network attached storage and only has to include the host interface controller 110 connected to the host computer 20 and the host interface controller 120 connected to the disk array apparatus as the data transfer destination.

Figure 18:
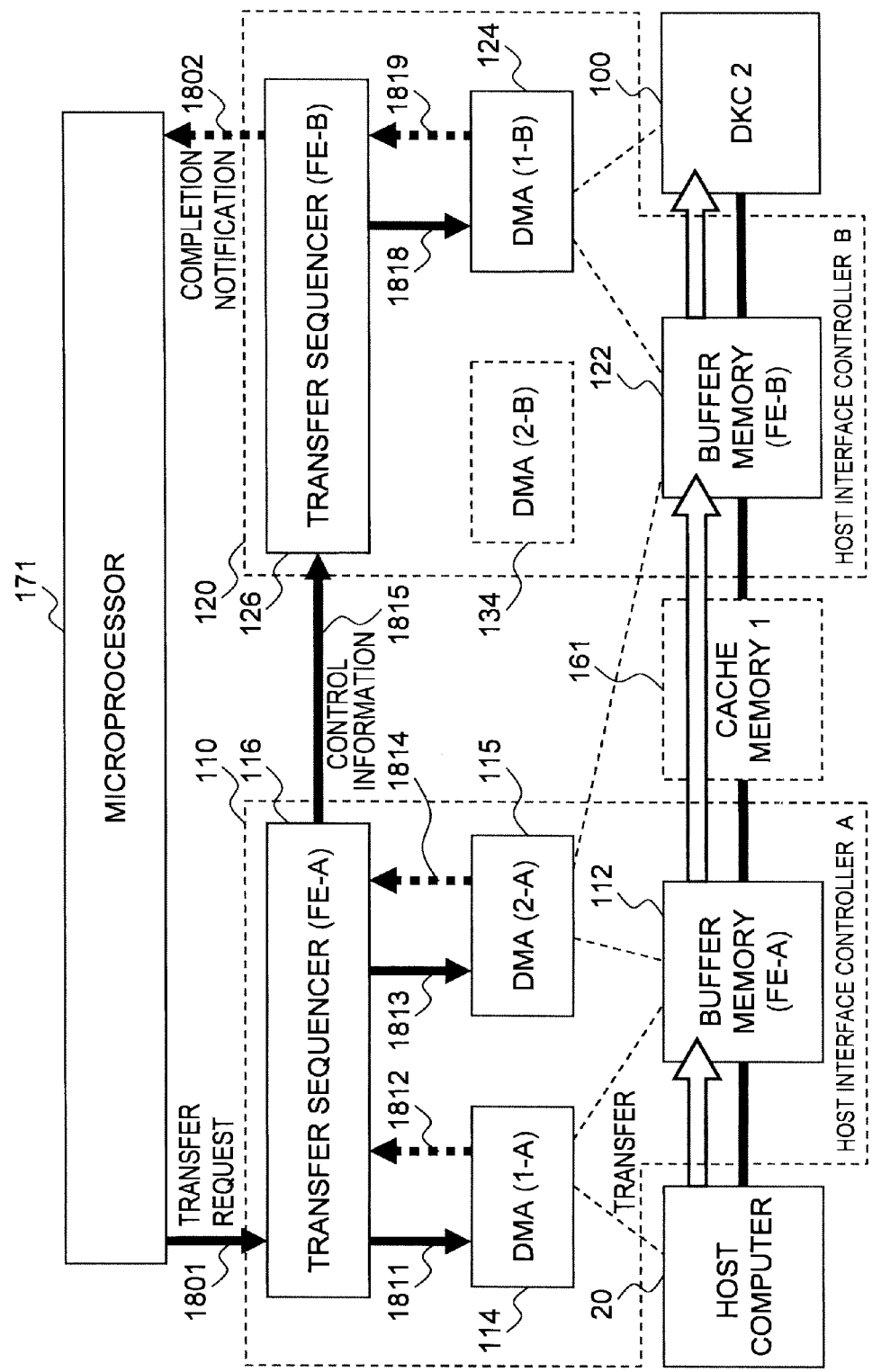
FIG. 18 is a diagram showing a transfer of write data of the disk array apparatus of the third embodiment of the present invention.

FIG. 18 is a diagram of the transfer of data of the disk array apparatus of the third embodiment showing an example of a cache-less transfer of write data in the transfer-source disk array apparatus shown in FIG. 17A.

A microprocessor 171 transmits a data transfer request 1801 to a transfer sequencer (FE-A) 116 of the host interface controller A(110), instructs data transfers to DMA controllers 114, 115 and instructs a data transfer to a DMA controller 124 via a transfer sequencer (FE-B) 126 of a host interface controller B(110).

First, the microprocessor 171 assembles a transfer sequence used to transfer data transmitted from the host computer 20 to the buffer memory in the storage device of the disk unit 200 and transmits the transfer request 1801 including this sequence to the transfer sequencer (FE-A) 116.

Specifically, the microcomputer 171 transmits the transfer request 1801 to the transfer sequencer (FE-A) 116 after writing DMA control parameters (address of a transfer source, address of a transfer destination, length of data to be transferred, transfer path, protection code, end status storage address) for the transfer of the data transmitted from the host computer 20 to the transfer-destination disk array apparatus (DKC2) via respective memories in a predetermined address of the buffer memory (FE-A) 112 of the host interface controller A(110). The transfer request 1801 to the transfer sequencer (FE-A) 116 includes an identifier of the DMA controller which is to be requested the data transfer, the data transfer request to each of the DMA controllers and an identifier of a requestor (microprocessor 171) as successive DMA start-up parameters.

When receiving the transfer request 1801, the transfer sequencer (FE-A) 116 extracts the identifier of the DMA controller which is to be requested the data transfer and information of the data transfer request to each of the DAM controllers, which includes the address where the DMA control parameters are stored and an identifier of a requestor (microprocessor 171), from the received transfer request 1801, and generates transfer requests 1811, 1813 to be transmitted to the DMA controllers 114, 115 in accordance with the obtained control parameters. The transfer requests 1811, 1813 to the DMA controllers 114, 115 include the address where the DMA control parameters are stored and an identifier of a requestor (transfer sequencer (FE-A) 116).

Then, the transfer sequencer (FE-A) 116 transmits the transfer request 1811 to transfer the data transmitted from the host computer 20 (actually, data stored in an unillustrated reception buffer) to the buffer memory (FE-A) 112 of the host interface controller A(110) to the DMA controller (1-A) 114.

When receiving the data transfer request 1811 from the transfer sequencer (FE-A) 116, the DMA controller (1-A) 114 transfers the data transmitted from the host computer 20 and stored in the reception buffer to the buffer memory (FE-A) 112 of the host interface controller A(110). Specifically, when receiving the transfer request 1811, the DMA controller (1-A) 114 obtains the control parameters (address of the transfer source, address of the transfer destination, length of data to be transferred, transfer path, protection code, end status storage address) from the address designated by the transfer request 1811 and transfers the data between the memories in accordance with the obtained control parameters.

When the data transfer to the buffer memory (FE-A) 112 is completed, the DMA controller A 114 transmits a completion notification 1812 to the transfer sequencer (FE-A) 116. Specifically, the DMA controller (1-A) 114 notifies the completion of the data transfer to the requestor identified by the identifier designated by the transfer request 1811.

When receiving the completion notification 1812 of the data transfer from the DMA controller (1-A) 114, the transfer sequencer (FE-A) 116 transmits the transfer request 1813 to transfer the data stored in the buffer memory (FE-A) 112 to the buffer memory (FE-B) 122 of the host interface controller B(120) to the DMA controller (2-A) 115 that controls the next data transfer.

When receiving the data transfer request 1813 from the transfer sequencer (FE-A) 116, the DMA controller (2-A) 115 transfers the data stored in the buffer memory (FE-A) 112 to the buffer memory (FE-B) 122. When the data transfer from the buffer memory (FE-A) 112 to the buffer memory (FE-B) 122 is completed, the DMA controller (2-A) 115 transmits a completion notification 1814 to the transfer sequencer (FE-A) 116.

When receiving the completion notification 1814 of the data transfer from the DMA controller (2-A) 115, the transfer sequencer (FE-A) 116 transmits control information 1815 for controlling the subsequent transfers to the transfer sequencer (FE-B) 126 of the host interface controller B(120) that controls the next control.

When receiving the control information 1815 from the transfer sequencer (FE-A) 116, the transfer sequencer (FE-B) 126 transmits a transfer request 1818 to transfer the data stored in the buffer memory (FE-B) 122 to the disk controller 2(100) of the transfer-destination disk array apparatus to the DMA controller (1-B) 124 that controls the next transfer.

When receiving the data transfer request 1818 from the transfer sequencer (FE-B) 126, the DMA controller (1-B) 124 transfers the data stored in the buffer memory (FE-B) 122 to a reception buffer of the disk controller 2(100). When the data transfer from the buffer memory (FE-B) 122 is completed, the DMA controller (1-B) 124 transmits a completion notification 1819 to the transfer sequencer (FE-B) 126.

When receiving the completion notification 1819 of the data transfer from the DMA controller (1-B) 124, the transfer sequencer (FE-B) 126 transmits a completion notification 1802 of the data transfer to the transfer-destination disk array apparatus to the microprocessor 171. Actually, the transfer sequencer (FE-B) 126 writes an end status in the address designated by the transfer request 1801 and the microprocessor 171 notifies the completion of the data transfer by checking data in this address at a predetermined timing.

Figure 19:
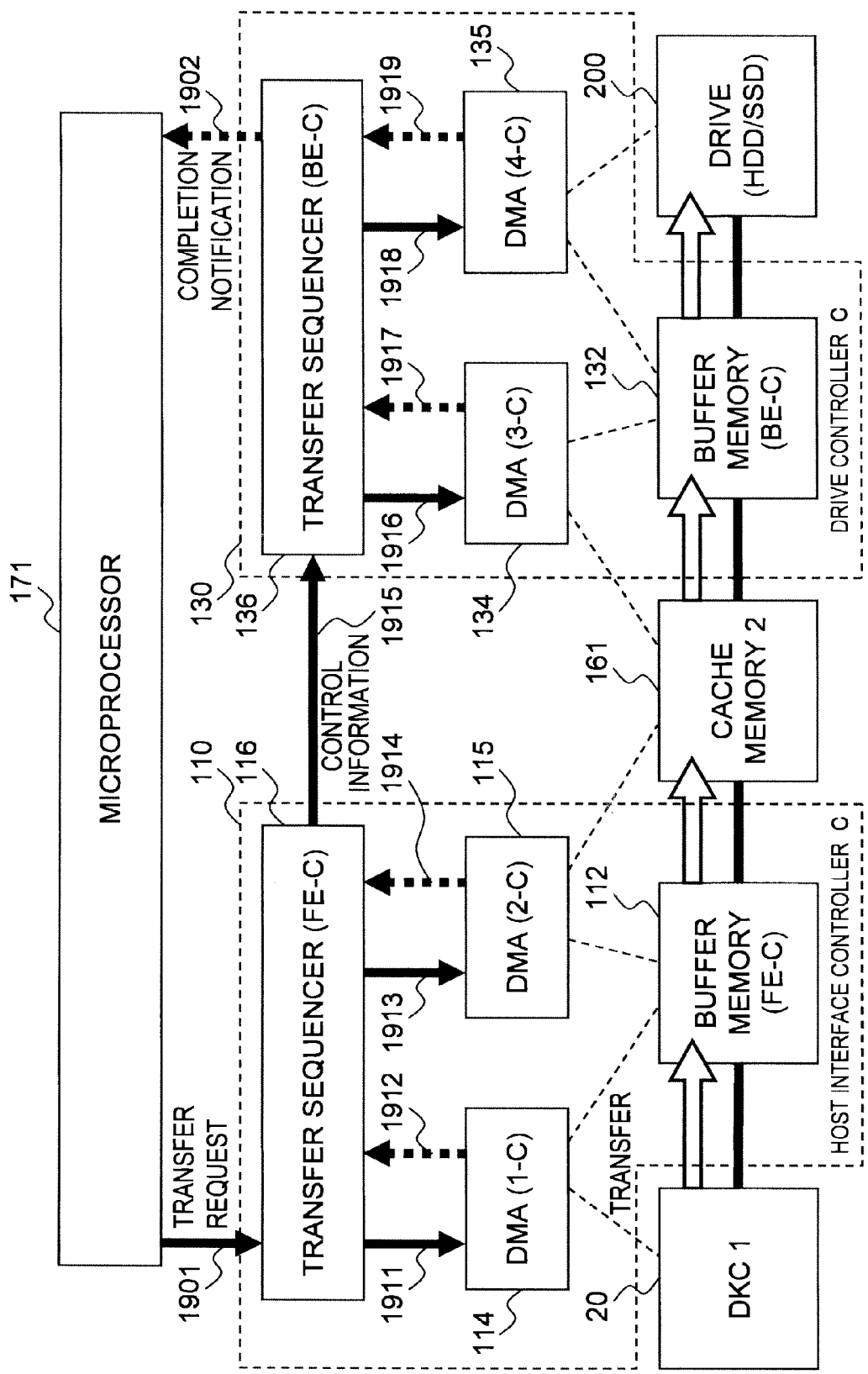
FIG. 19 is a diagram showing a transfer of write data of the disk array apparatus of the third embodiment of the present invention.

FIG. 19 is a diagram of the transfer of data of the disk array apparatus of the third embodiment showing an example of the transfer of write data in the transfer-destination disk array apparatus shown in FIG. 17B.

A microprocessor 171 transmits a data transfer request 1901 to a transfer sequencer (FE-C) 116 of the host interface controller 110, instructs data transfers to DMA controllers 114, 115 and instructs data transfers to DMA controllers 134, 135 via a transfer sequencer (BE-C) 136 of the drive controller 130.

First, the microprocessor 171 assembles a transfer sequence used to transfer data transmitted from the transfer-source disk array apparatus (DKC1) to the buffer memory in the storage device of the disk unit 200 and transmits the transfer request 1901 including this sequence to the transfer sequencer (FE-C) 116.

Specifically, the microcomputer 171 transmits the transfer request 1901 to the transfer sequencer (FE-C) 116 after writing the DMA control parameters (address of the transfer source, address of the transfer destination, length of data to be transferred, transfer path, protection code, end status storage address) for the transfer of the data transmitted from the transfer-source disk array apparatus (DKC1) to the storage device of the disk unit 200 via respective memories in a predetermined address of the buffer memory (FE-C) 112 of the host interface controller 110. The transfer request 1901 to the transfer sequencer (FE-C) 116 includes an identifier of the DMA controller which is to be requested the data transfer, the data transfer request to each of the DMA controllers and an identifier of a requestor (microprocessor 171) as successive DMA start-up parameters.

When receiving the transfer request 1901, the transfer sequencer (FE-C) 116 extracts the identifier of the DMA controller which is to be requested the data transfer and information of the data transfer request to each of the DAM controllers, which includes the address where the DMA control parameters are stored and an identifier of a requestor (microprocessor 171), from the received transfer request 1901, and generates transfer requests 1911, 1913 to be transmitted to the DMA controllers 114, 115 in accordance with the obtained control parameters. The transfer requests 1911, 1913 to the DMA controllers 114, 115 include the address where the DMA control parameters are stored and an identifier of a requestor (transfer sequencer (FE-C) 116).

Then, the transfer sequencer (FE-C) 116 transmits the transfer request 1911 to transfer the data transmitted from the transfer-source disk array apparatus (DKC1) (actually, data stored in the unillustrated reception buffer) to the buffer memory (PE-C) 112 of the host interface controller 110 to the DMA controller (1-C) 114.

When receiving the data transfer request 1911 from the transfer sequencer (FE-C) 116, the DMA controller (1-C) 114 transfers the data transmitted from the transfer-source disk array apparatus (DKC1) and stored in the reception buffer to the buffer memory (FE-C) 112 of the host interface controller 110. Specifically, when receiving the transfer request 1911, the DMA controller (1-C) 114 obtains the control parameters (address of the transfer source, address of the transfer destination, length of data to be transferred, transfer path, protection code, end status storage address) from the address designated by the transfer request 1911 and transfers the data between the memories in accordance with the obtained control parameters.

When the data transfer to the buffer memory (FE-C) 112 is completed, the DMA controller (1-C) 114 transmits a completion notification 1912 to the transfer sequencer (FE-C) 116. Specifically, the DMA controller (1-C) 114 notifies the completion of the data transfer to the requestor identified by the identifier designated by the transfer request 1911.

When receiving the completion notification 1912 of the data transfer from the DMA controller (1-C) 114, the transfer sequencer (FE-C) 116 transmits the transfer request 1913 to transfer the data stored in the buffer memory (FE-C) 112 to a cache memory 2(161) to the DMA controller (2-C) 115 that controls the next data transfer.

When receiving the data transfer request 1913 from the transfer sequencer (FE-C) 116, the DMA controller (2-C) 115 transfers the data stored in the buffer memory (FE-C) 112 to the cache memory 2(161). When the data transfer from the buffer memory (FE-C) 112 to the cache memory 2(161) is completed, the DMA controller (2-C) 115 transmits a completion notification 1914 to the transfer sequencer (FE-C) 116.

When receiving the completion notification 1914 of the data transfer from the DMA controller (2-C) 115, the transfer sequencer (FE-C) 116 transmits control information 1915 for controlling the subsequent transfers to the transfer sequencer (BE-C) 136 of the drive controller 130 that controls the next control.

When receiving the control information 1915 from the transfer sequencer (FE-C) 16, the transfer sequencer (BE-C) 136 transmits a transfer request 1916 to transfer the data stored in the cache memory 2(161) to the buffer memory (BE-C) 132 of the drive controller 130 to the DMA controller (3-C) 134 that controls the next transfer.

When receiving the data transfer request 1916 from the transfer sequencer (BE-C) 136, the DMA controller (3-C) 134 transfers the data stored in the cache memory 2(161) to the buffer memory (BE-C) 132. When the data transfer from the cache memory 2(161) to the buffer memory (BE-C) 132 is completed, the DMA controller (3-C) 134 transmits a completion notification 1917 to the transfer sequencer (BE-C) 136.

When receiving the completion notification 1917 of the data transfer from the DMA controller (3-C) 134, the transfer sequencer (BE-C) 136 transmits a transfer request 1918 to transfer the data stored in the buffer memory (BE-C) 132 to the disk unit 200 to the DMA controller (4-C) 135 that controls the next transfer.

When receiving the data transfer request 1918 from the transfer sequencer (BE-C) 136, the DMA controller (4-C) 135 transfers the data stored in the buffer memory (BE-C) 132 to the disk unit 200 (e.g. buffer memory in the storage device). When the data transfer from the buffer memory (BE-C) 132 is completed, the DMA controller (4-C) 135 transmits a completion notification 1919 of the data transfer to the transfer sequencer (BE-C) 136.

When receiving the completion notification 1919 of the data transfer from the DMA controller (4-C) 135, the transfer sequencer (BE-C) 136 transmits a completion notification 1902 of the data transfer to the disk unit 200 to the microprocessor 171. Actually, the transfer sequencer (BE-C) 136 writes an end status in the address designated by the transfer request 1901 and the microprocessor 171 notifies the completion of the data transfer by checking data in this address at a predetermined timing.

Note that although the data to be written in the disk unit 200 is temporarily stored in the cache memory 2(161) of the disk array apparatus as the data transfer destination while the cache memory 1(161) of the disk array apparatus as the data transfer source is skipped in the third embodiment, the data may be transferred while both the cache memory 1(161) of the disk array apparatus as the data transfer source and the cache memory 2(161) of the disk array apparatus as the data transfer destination are skipped.

Further, data may be transferred while one or more arbitrary memories out of the buffer memory (FE-A) 112, the cache memory 1(160) and the buffer memory (FE-B) 122 of the disk array apparatus as the data transfer source and the buffer memory (FE-C) 112, the cache memory 2(161) and the buffer memory (BE-C) 132 of the disk array apparatus as the data transfer destination are skipped.

As described above, since data is transferred between the memories using the transfer sequencers 116, 136 according to the third embodiment of the present invention, the microprocessor 171 of each disk array apparatus only transmits one transfer request to the transfer sequencer 116 or 136 and a load on the microprocessor 171 can be reduced also in the cache-less transfer at the time of external connection. Further, since each microprocessor 171 only receives one transfer completion notification from the transfer sequencer 116 or 136, the switching overhead of the process for processing the completion notification becomes unnecessary and the load on the microprocessor 171 can be reduced also in the cache-less transfer at the time of external connection.

<Fourth Embodiment>

Figure 20:
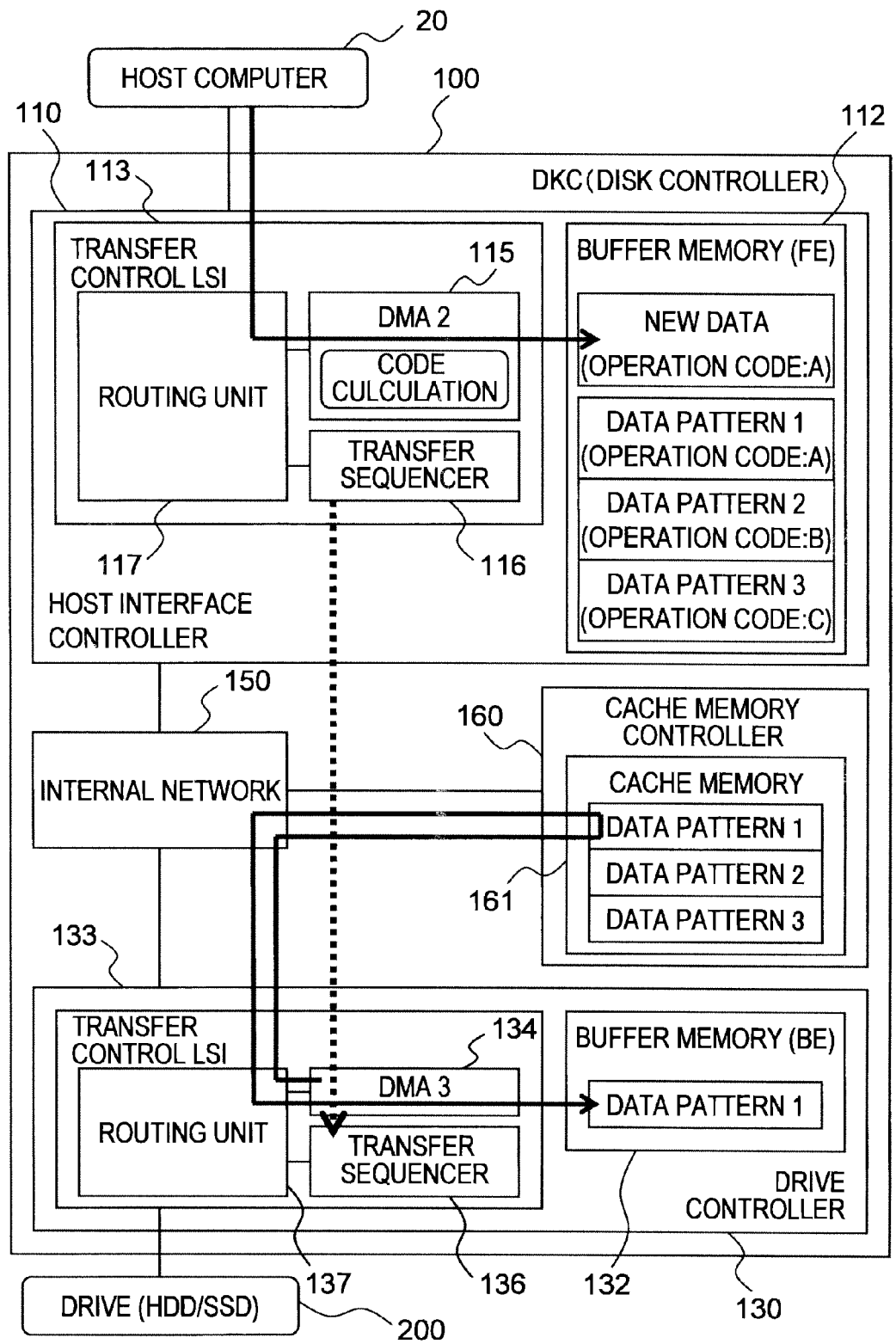
FIG. 20 is a block diagram of an example of the configuration of a disk array apparatus of a fourth embodiment of the present invention.

FIG. 20 is a block diagram of an example of a configuration of a disk array apparatus according to a fourth embodiment of the present invention showing a data transfer in the case of performing a de-duplication process for write data.

Data requested to be written from a host computer 20 is transferred to a buffer memory (FE) 112 by a DMA controller 114 of a protocol LSI (FE) 111 of a host interface controller 110. A DMA controller 115 of a transfer control LSI 113 calculates an operation code (e.g. hash value) of the data (requested to be written from the host computer 20) stored in the buffer memory (FE) 112. A transfer sequencer (FE) 116 compares the calculated operation code with an operation code of data of a predetermined pattern stored in the buffer memory (FE) 112, and determines whether there is a possibility that the data requested to be written from the host computer 20 coincides with the data of the predetermined pattern. Further, the transfer sequencer (FE) 116 compares the data requested to be written from the host computer 20 and the data of the predetermined pattern, and determines whether the data requested to be written from the host computer 20 coincides with the data of the predetermined pattern.

As a result, if the data requested to be written from the host computer 20 coincides with the data of the predetermined pattern, the transfer sequencer (FE) 116 transmits control information to a transfer sequencer (BE) 136 of a drive controller 130 that controls the next data transfer and instructs to transfer the data of the predetermined pattern stored in a cache memory to a buffer memory (BE) 132 of the drive controller 130.

The transfer sequencer (BE) 136 requests a DMA controller 134 to transfer the data of the predetermined pattern stored in the cache memory 161 to the buffer memory (BE) 132 of the drive controller 130. The DMA controller 134 transfers the data of the predetermined pattern stored in the cache memory 161 to the buffer memory (BE) 132 of the drive controller 130 in accordance with the request from the transfer sequencer.

Figure 21:
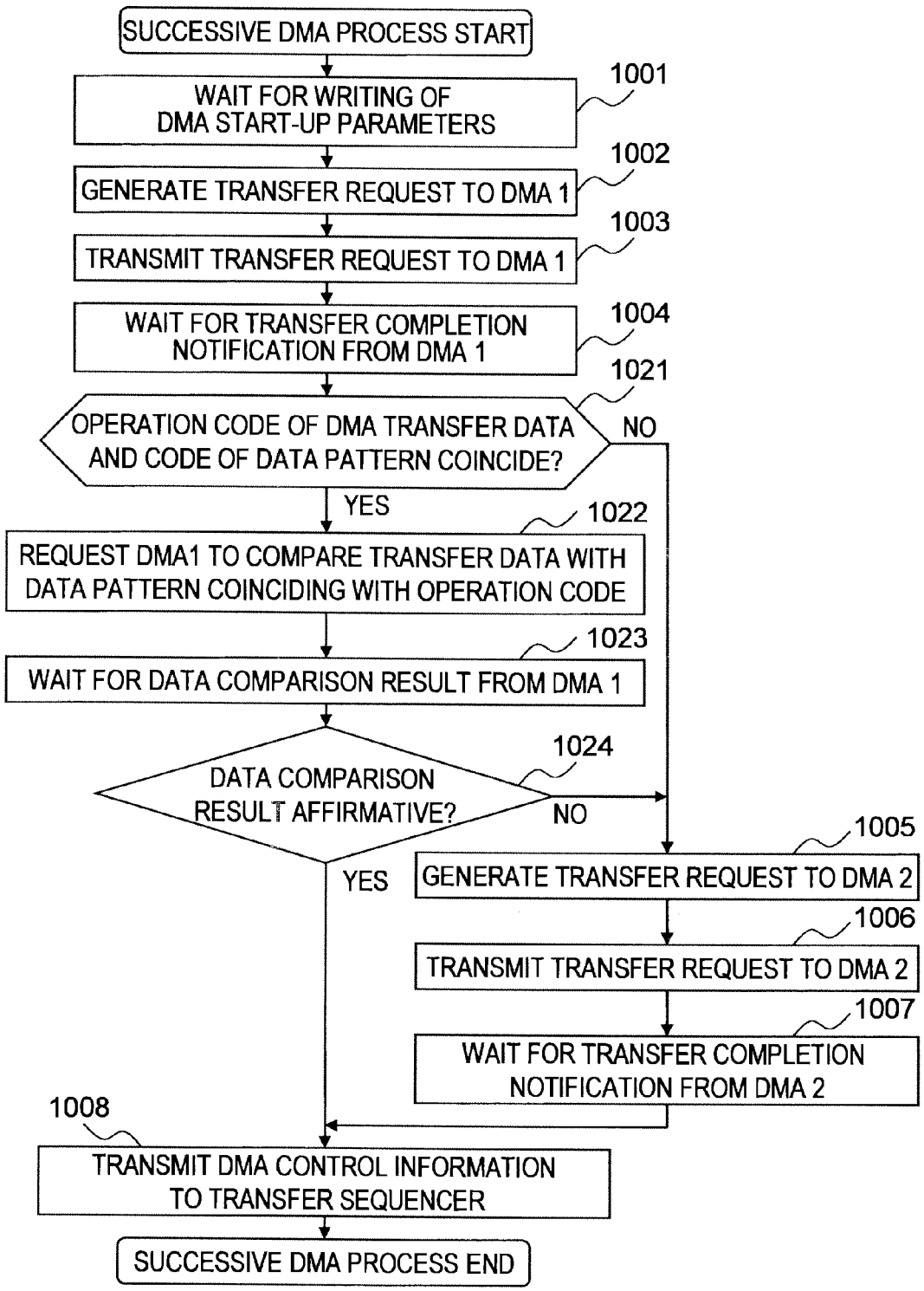
FIG. 21 is a flow chart of a successive DMA process executed by the transfer sequencer (FE) of the fourth embodiment of the present invention.

FIG. 21 is a flow chart of a successive DMA process of the fourth embodiment showing a process executed by the transfer sequencer (FE) 116 at the time of transferring write data from the host computer 20 to a disk unit 200.

First, the transfer sequencer (FE) 116 confirms whether DMA start-up parameters have been written by a microprocessor 171 (1001), obtains DMA control parameters and generates a transfer request in accordance with the obtained DMA control parameters (1002), transmits the generated transfer request to the DMA controller 114 (1003) and waits for a completion notification of the data transfer from the DMA controller 114 (1004). This process from Steps 1001 to 1004 is the same as in the first embodiment (FIG. 10) described above.

Thereafter, the transfer sequencer (FE) 116 causes the DMA controller 114 to compare the operation code (e.g. hash value) of the data stored in the buffer memory (FE) 112 and the predetermined value (1021).

As a result, if the operation code and the predetermined value do not coincide and the data stored in the buffer memory (FE) 112 is inferred not to be the data of the predetermined pattern, it is determined that the data stored in the buffer memory (FE) 112 needs to be transferred to the disk unit 200 and the process proceeds to Step 1005. On the other hand, if the operation code and the predetermined value coincide and the data stored in the buffer memory (FE) 112 is inferred to be the data of the predetermined pattern, the DMA controller 114 is requested to compare the data stored in the buffer memory (FE) 112 and the data of the predetermined pattern (1022) and a comparison result from the DMA controller 114 is waited for (1023).

As a result, if the compared data coincide (YES in 1024), the process proceeds to Step 1008. This is to improve response performance of the disk array apparatus 1 by reducing data transfers between the memories when data to be written from the host computer is a pattern that seems to be frequently used (e.g. all bits are "0").

On the other hand, if the compared data do not coincide, the transfer sequencer (FE) 116 generates a transfer request to be transmitted to the DMA controller 115 that controls the next data transfer (1005), transmits the generated transfer request to the DMA controller 115 (1006), waits for a completion notification of the data transfer from the DMA controller 115 (1007) and proceeds to Step 1008. The process from Steps 1005 to 1007 is the same as in the first embodiment (FIG. 10) described above.

In Step 1008, the transfer sequencer (FE) 116 transmits control information for controlling the subsequent transfers by writing the control information in a local memory of the transfer sequencer (BE) 136 of the drive controller 130 that controls the next data transfer.

Specifically, if a comparison result in Step 1024 is affirmative, the same data as the data to be transferred is stored in the cache memory 161. Thus, the transfer sequencer (FE) 116 generates control information used to transfer the data of the predetermined pattern stored in the cache memory 161 to the buffer memory (BE) 132 of the drive controller 130. Then, the transfer sequencer (FE) 116 writes the generated control information in the local memory of the transfer sequencer (BE) 136 of the drive controller 130 that controls the next transfer.

Further, if the comparison result in Step 1024 is negative, the transfer sequencer (FE) 116 generates control information including an address indicating the DMA control parameters generated by the microprocessor 171 and writes the generated control information in the local memory of the transfer sequencer (BE) 136.

As described above, since data is transferred between the memories using the transfer sequencers 116, 136 according to the fourth embodiment of the present invention, the microprocessor 171 only transmits one transfer request to the transfer sequencer 116 or 136 and a load on the microprocessor 171 can be reduced also in a data transfer in the case of performing a de-duplication process. Further, since the microprocessor 171 only receives one transfer completion notification from the transfer sequencer 116 or 136, the switching overhead of the process for processing the completion notification becomes unnecessary and the load on the microprocessor 171 can be reduced also in a data transfer in the case of performing a de-duplication process.

Although the data transfer in the case of performing the de-duplication process for write data in the fourth embodiment has been thus far described using FIGS. 20 and 21, the data of the predetermined pattern stored in the cache memory 161 is similarly transferred to the host computer 20 also at the time of reading if read data is the data of the predetermined pattern.

That is, the transfer sequencer (BE) 136 of the drive controller 130 determines whether read data read from the disk unit 200 is the data of the predetermined pattern. If the read data read from the disk unit 200 is the data of the predetermined pattern, the transfer sequencer (FE) 116 of the host interface controller 110 executes a control to transfer the data of the predetermined pattern stored in the cache memory 161 to the buffer memory (FE) 112 of the host interface controller 110.

While the present invention has been described in detail and pictorially in the accompanying drawings, the present invention is not limited to such detail but covers various obvious modifications and equivalent arrangements, which fall within the purview of the appended claims.

The invention claimed is:

1. A storage system for inputting and outputting data in accordance with a request from a host computer, comprising:
   at least one processor configured to process data requested to be input or output;
   a plurality of transfer controllers configured to transfer data between memories in the storage system; and
   at least one transfer sequencer configured to request a data transfer to the plurality of transfer controllers in accordance with an instruction from the processor; wherein:
   the processor is configured to transmit a series of data transfer requests to the at least one transfer sequencer;
   the at least one transfer sequencer is configured to request a data transfer to each of the plurality of transfer controllers based on the series of data transfer requests; and
   each transfer controller is configured to transfer data between the memories in accordance with an instruction from the at least one transfer sequencer,
   wherein a data transfer request includes an address where DMA control parameters are stored, and
   wherein DMA control parameters include address of a transfer source, address of a transfer destination, length of data to be transferred, transfer path, protection code, and end status storage address.

2. The storage system according to claim 1, further comprising:
   a host interface coupled to the host computer;
   a storage device configured to store write data requested to be written from the host computer;
   a disk interface coupled to the storage device; and
   a cache memory configured to store data being transferred from the host interface to the disk interface, wherein:
   the processor is configured to generate a first parameter used to transfer the write data from the host interface to the disk interface without storing the write data in the cache memory and a second parameter used to transfer the write data from the disk interface to the storage device; and
   the at least one transfer sequencer is configured to control cache-less data transfer from the host interface to the disk interface without storing data in the cache memory in accordance with the generated first parameter, and control data transfer from the disk interface to the storage device in accordance with the generated second parameter.

3. The storage system according to claim 2, wherein the processor is configured to generate the first parameter for the cache-less data transfer in a case where the write data is longer than a predetermined length.

4. The storage system according to claim 2, wherein the processor is configured to generate the first parameter for the cache-less data transfer in a case where the storage device in which the write data is to be written is a semiconductor storage device.

5. The storage system according to claim 2, wherein the processor is configured to generate the first parameter for the cache-less data transfer in a case where the write data is stored in a storage device of another storage system.

6. The storage system according to claim 1, further comprising:
   a host interface coupled to the host computer;
   a storage device configured to store read data requested to be read from the host computer;
   a disk interface coupled to the storage device; and
   a cache memory configured to store temporarily data being transferred from the disk interface to the host interface, wherein:
   the processor is configured to generate a third parameter used to transfer the read data from the storage device to the disk interface and a fourth parameter used to transfer the read data from the disk interface to the host interface without storing the read data in the cache memory; and
   the at least one transfer sequencer is configured to control data transfer from the storage device to the disk interface in accordance with the generated third parameter, and control cache-less data transfer from the disk interface to the host interface without storing data in the cache memory in accordance with the generated fourth parameter.

7. The storage system according to claim 6, wherein the processor is configured to generate the fourth parameter for the cache-less data transfer in a case where the read data is longer than a predetermined length.

8. The storage system according to claim 6, wherein the processor is configured to generate the fourth parameter for the cache-less data transfer in a case where the storage device in which the read data is stored is a semiconductor storage device.

9. The storage system according to claim 6, wherein the processor is configured to generate the fourth parameter for the cache-less data transfer in a case where the read data requested to be read from the host computer is stored in a storage device of another storage system.

10. The storage system according to claim 1, further comprising:
    a host interface coupled to the host computer;
    a storage device configured to store write data requested to be written from the host computer;
    a disk interface coupled to the storage device; and
    a cache memory configured to store temporarily the data requested to be written from the host computer, wherein:
    the at least one transfer sequencer includes a first transfer sequencer implemented in the host interface and a second transfer sequencer implemented in the disk interface;

the processor is configured to generate a fifth parameter used to transfer the write data from the host interface to the disk interface and a sixth parameter used to transfer the write data from the disk interface to the storage device;

the first transfer sequencer is configured to change the sixth parameter generated by the processor and instruct the second transfer sequencer to transfer the data in a case where the write data is predetermined data; and the second transfer sequencer is configured to control, in accordance with the changed sixth parameter, transfer of data stored in a predetermined address of the cache memory to the disk interface and a transfer of the data from the disk interface to the storage device.

11. The storage system according to claim 1, further comprising:

a host interface coupled to the host computer;

a storage device configured to store write data requested to be written from the host computer;

a disk interface coupled to which the storage device; and a cache memory configured to store temporarily data being transferred from the host interface to the disk interface, wherein:

the host interface is configured to include a first buffer memory for temporarily storing data input to the host interface;

the disk interface is configured to include a second buffer memory for temporarily storing data input to the disk interface;

the processor is configured to generate a parameter used to transfer the write data from the host interface to the disk interface without storing in the cache memory and the at least one of the first and second buffer memories; and the at least one transfer sequencer is configured to control cache-less data transfer of the write data to the storage device without storing data in the cache memory and the at least one of the first and second buffer memories in accordance with the generated parameter.

12. A computer system, comprising:

a first storage system; and a second storage system, the first storage system including:

at least one first processor configured to process data requested to be input and output;

a plurality of first transfer controllers configured to transfer data between memories in the first storage system;

at least one first transfer sequencer configured to request the plurality of first transfer controllers to transfer data in accordance with an instruction from the processor;

a first host interface coupled to a host computer;

a second host interface coupled to the second storage system; and a first cache memory configured to store temporarily data being transferred from the first host interface to the second host interface, and the second storage system including:

at least one second processor configured to process write data requested to be input and output;

a plurality of second transfer controllers configured to transfer data between memories in the second storage system;

at least one second transfer sequencer configured to request the plurality of second transfer controllers to transfer data in accordance with an instruction from the processor;

a third host interface coupled to the first storage system;

a storage device configured to store data requested to be written from the host computer;

a disk interface coupled to the storage device; and a second cache memory configured to store temporarily data being transferred from the third host interface to the disk interface, wherein:

the first processor is configured to generate a seventh parameter used to transfer the write data from the first host interface to the second host interface without storing the write data in the first cache memory, an eighth parameter used to transfer the write data from the second host interface to the third host interface, a ninth parameter used to transfer the write data from the third host interface to the disk interface without storing the write data in the second cache memory and a tenth parameter used to transfer the write data from the disk interface to the storage device;

the at least one first transfer sequencer is configured to control cache-less data transfer from the first host interface to the second host interface without storing data in the first cache memory in accordance with the generated seventh parameter, and control data transfer from the second host interface to the third host interface in accordance with the generated eighth parameter; and the at least one second transfer sequencer is configured to control cache-less data transfer from the third host interface to the disk interface without storing data in the second cache memory in accordance with the generated ninth parameter, and control data transfer from the disk interface to the storage device in accordance with the generated tenth parameter, wherein a request to transfer data includes an address where DMA control parameters are stored, and wherein DMA control parameters include address of a transfer source, address of a transfer destination, length of data to be transferred, transfer path, protection code, and end status storage address.

13. A transfer control method for data in a storage system for inputting and outputting data in accordance with a request from a host computer, the storage system including at least one processor for processing data requested to be input and output, a plurality of transfer controllers for transferring data between memories, and a transfer sequencer for requesting the plurality of transfer controllers to transfer data in accordance with an instruction from the processor, the method including:

transmitting, by the processor, a series of data transfer requests to the transfer sequencer;

requesting, by the transfer sequencer, each of the plurality of transfer controllers to transfer data based on the series of data transfer requests; and transferring, by each transfer controller, the data between the memories in accordance with an instruction from the transfer sequencer, wherein a data transfer request includes an address where DMA control parameters are stored, and wherein DMA control parameters include address of a transfer source, address of a transfer destination, length of data to be transferred, transfer path, protection code, and end status storage address.

14. The transfer control method according to claim 13, wherein
the storage system further includes a host interface coupled to the host computer, a storage device configured to store write data requested to be written from the host computer, a disk interface coupled to the storage device, and a cache memory configured to store temporarily data being transferred from the host interface to the disk interface, and
the method further includes the steps of:
generating, by the processor a first parameter used to transfer the write data from the host interface to the disk interface without passing through the cache memory and a second parameter used to transfer the write data from the disk interface to the storage device;
controlling, by the transfer sequencer, cache-less data transfer from the host interface to the disk interface without storing the write data in the cache memory in accordance with the generated first parameter; and
controlling, by the transfer sequencer, data transfer from the disk interface to the storage device in accordance with the generated second parameter.

15. The transfer control method according to claim 13, wherein
the storage system further includes a host interface coupled to the host computer, a storage device configured to store read data requested to be read from the host computer, a disk interface coupled to the storage device, and a cache memory configured to store temporarily data being transferred from the disk interface to the host interface, and
the method further includes the steps of:
generating, by the processor, a third parameter used to transfer the write data from the storage device to the disk interface and a fourth parameter used to transfer the write data from the disk interface to the host interface without storing in the cache memory;
controlling, by the transfer sequencer, data transfer from the storage device to the disk interface in accordance with the generated third parameter; and
controlling, by the transfer sequencer, cache-less data transfer from the disk interface to the host interface without storing the read data in the cache memory in accordance with the generated fourth parameter.

* * * * *